(12) United States Patent
Okamura

(10) Patent No.: US 6,934,287 B2
(45) Date of Patent: Aug. 23, 2005

(54) PACKET HANDLER OF AUDIO DATA BY ISOCHRONOUS MODE

(75) Inventor: Kazuhisa Okamura, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 10/793,313

(22) Filed: Mar. 3, 2004

(65) Prior Publication Data

US 2004/0264485 A1 Dec. 30, 2004

Related U.S. Application Data

(62) Division of application No. 09/532,835, filed on Mar. 21, 2000, now Pat. No. 6,751,228.

(30) Foreign Application Priority Data

| Mar. 23, 1999 | (JP) | 11-078036 |
| Mar. 23, 1999 | (JP) | 11-078037 |
| Mar. 23, 1999 | (JP) | 11-078038 |
| Mar. 23, 1999 | (JP) | 11-078039 |
| Mar. 23, 1999 | (JP) | 11-078040 |
| Mar. 23, 1999 | (JP) | 11-078041 |
| Mar. 23, 1999 | (JP) | 11-078042 |

(51) Int. Cl.[7] .................................................. H04J 3/06
(52) U.S. Cl. ...................... 370/389; 370/474; 370/509; 370/516; 375/371
(58) Field of Search ................................. 370/389, 394, 370/474, 503, 509, 516; 375/354, 355, 356, 359, 362, 365, 371

(56) References Cited

U.S. PATENT DOCUMENTS

| 5,600,650 A | * | 2/1997 | Oskouy ...................... 370/468 |
| 5,710,773 A | | 1/1998 | Shiga |
| 5,973,748 A | | 10/1999 | Horiguchi et al. |
| RE36,633 E | * | 3/2000 | Fleischer et al. ........... 375/354 |
| 6,144,714 A | * | 11/2000 | Bleiweiss et al. ........... 375/376 |
| 6,157,659 A | * | 12/2000 | Bird ............................ 370/538 |
| 6,408,012 B1 | | 6/2002 | Sato |
| 6,671,342 B2 | * | 12/2003 | Lin et al. .................... 375/375 |

FOREIGN PATENT DOCUMENTS

| JP | 05-037560 | 2/1993 |
| JP | 07-326127 | 12/1995 |
| JP | 07-327287 | 12/1995 |
| JP | 08-097807 | 4/1996 |
| JP | 9-233098 | 9/1997 |
| JP | 09-247167 | 9/1997 |
| JP | 9-281961 | 10/1997 |
| JP | 9-298558 | 11/1997 |
| JP | 10-145753 | 5/1998 |
| JP | 10-164108 | 6/1998 |
| JP | 10-190736 | 7/1998 |
| JP | 10-257080 | 9/1998 |
| JP | 10-257096 | 9/1998 |
| JP | 10-226211 | 12/1998 |
| JP | 11-065973 | 3/1999 |
| JP | 11-068801 | 3/1999 |
| JP | 11-252125 | 9/1999 |

* cited by examiner

Primary Examiner—Min Jung
(74) Attorney, Agent, or Firm—Morrison & Foerster, LLP

(57) ABSTRACT

Packet transfer apparatus transmits/receives event sequence data such as audio data and music data over a fast serial network to which a plurality of devices are connected. The input section sequentially inputs event sequence data, which is sampled at a double rate by a sampling clock signal having a half period of the input clock signal. The input section can switch between a fast sampling mode where the event sequence data is sampled at a double rate by a sampling clock signal having a half period of the input clock signal and a regular sampling mode where the event sequence data is sampled at a regular rate by another sampling clock signal having the same period as the input clock signal, and further a regular packetizing section operates under the regular sampling mode for generating a packet of the inputted event sequence data in response to only one of the leading edge and the trailing edge of the input clock signal and adds the timestamp every time the predetermined number of data blocks are packetized by the regular packetizing section.

6 Claims, 12 Drawing Sheets

PACKET HANDLER OF AUDIO DATA BY ISOCHRONOUS MODE

CROSS-REFERENCE TO RELATED APPLICATION

This application is a division of application Ser. No. 09/532,835 filed on Mar. 21, 2000 now U.S. Pat. No. 6,751,228, which application is specifically incorporated herein, in its entirety, by reference.

BACKGROUND OF THE INVENTION

1. Field of the Invention

The present invention relates generally to a packet transfer apparatus for transmitting and/or receiving event sequence data such as audio data and music data over a fast serial network to which a plurality of devices are connected.

2. Description of Related Art

A technology of transmitting audio data such as voice and tone and MIDI data over an IEEE 1394 serial network configured by sequentially coupling a plurality of electronic musical instruments and audio equipment units with cables is known as "Audio and Music Data Transmission Protocol, Version 1.0, 1997-5, 1394 Trade Association."

Referring to FIG. 10, there is shown a diagram illustrating flows of packets over a network. This network has three transmitting nodes 101, 102, and 103 and one receiving node 104. In this example, audio data inputted from peripheral devices at these transmitting nodes 101, 102 and 103 are reproduced by a peripheral device at this receiving node 104. The transmitting nodes 101, 102, and 103 each send a packet or packets. The receiving node 104 receives these packets and reproduces, at a predetermined sampling rate, the audio data contained in the packet received from desired one of the transmitting nodes. References 105a through 105d denote packets supplied from the transmitting A node 101, 106a through 106c denote packets supplied from the transmitting B node 102, and 107 denotes a packet supplied from the transmitting C node 103.

The timing of the entire network is controlled by a cycle master node (not shown). The cycle master node sends cycle start packets in every 125 microseconds to the other nodes. Every time the nodes receive a cycle start packet, each node is synchronized with the cycle master node by setting the cycle timer in each node by the absolute time information contained in the cycle start packet.

Each of the transmitting nodes 101, 102, and 103 generates a timestamp (abbreviated as "syt"), one in every 8 sampling clocks (or 8 data blocks), on the basis of the time provided by the cycle timer, for the audio data reproduced at a predetermined sampling clock by a peripheral device connected to that transmitting node. Each transmitting node also arranges audio data of one or more channels into a data field and arranges the associated timestamp into a syt field so as to form a packet composed of the data field and the syt field, and sends the packet. The timestamp specifies the reproduction time at the receiving side of an event sequence (or an audio channel). DBC (Data Block Count) indicates the total number of data blocks sent so far. Each of the data blocks is generally made up of data of two or more event sequences generated at the same sampling time.

Referring to FIG. 11, there is shown a diagram illustrating a packet format for use at isochronous transmission. Isochronous transmission denotes a mode of data transmission defined in the link layer of IEEE 1394. In this transmission mode, a transmission delay is compensated and each node is allocated with a communication band in advance. The packet format is made up of an isochronous header, a CIP (Common Isochronous Packet format) header, and a data field having basically a width of 32 bits. The isochronous header includes sub-fields of data length, tag, channel (isochronous transmission channel), "1000" bit train (tcode) indicative of isochronous data packet, synchronization (sync), and header CRC (Cyclic Redundancy Check).

The CIP header contains various items necessary for a receipt operation, such fields as DBS (Data Block Size). DBC (Data Block Count), and syt. The syt field of a packet having no timestamp is written with "no data" value. The data field contains audio data and MIDI data. Available for the data format of the data field are (1) AM824 generic format, (2) AM824 IEC958 conformant, (3) AM824 Raw audio, (4) AM824 MIDI conformant, (5) 32-bit Data format, and (6) 24*4 Audio pack format.

Referring to FIG. 12, there is shown an operational diagram illustrating isochronous transmission. Particularly, this diagram shows a transmission control operation. In the example shown in FIG. 10, a timestamp is attached to every 8 data blocks (at every 8 sampling clocks). In the example of FIG. 12, a timestamp is attached to every 4 data blocks (at every 4 sampling clock) and sampling frequency Fs is 26.7 KHz. The upper half part shows the transmit side, in which an event sequence (sampling data) is created. The lower half part shows the receive side, in which the event sequence (sampling data) is reproduced. In the middle part, packets are shown. In this example, sampling data reproduced with a predetermined sampling clock are generated as an event sequence in the transmitting node. The cycle timer of the transmitting node outputs a time value. The transmitting node generates an allocated band of data blocks once every nominal isochronous cycle (125 microseconds), attaches a timestamp in taking account of a transmission delay to each packet, and sends the resultant packets.

A first packet contains DBC=3 (namely, 3 data blocks have already been transmitted) and syt=R1, along with 3 data blocks. A second packet contains DBC=6 (namely, 6 data blocks have already been transmitted) and syt=R2 in predetermined fields, along with 4 data blocks. Likewise, third through fifth packets are transmitted. However, the fourth packet has no timestamp because this packet does not contain a data block of a sampling clock corresponding to the timestamp interval.

Each packet is received with a certain transfer delay by the receiving node. Then, the receiving node generates a reproduction sampling clock. Referring to FIG. 12, an item "INDEX" denotes a value indicative of a particular data block included in the packet and corresponding to the time of timestamp interval. This value (0, 1, 2 or 3) is obtained by performing computation on the DBC value and the timestamp interval.

Referring back to FIG. 10, value DBC=3 is added to the packet 105a to be transmitted by the transmitting A node 101. DBC=7 and syt=1000 are added to the packet 105b. The data block having the same time as the time of syt=1000 is DA0. DBC=16 and syt=9000 are added to the packet 105d. The data block having the same time as the time of syt=9000 is DA8. Data block DA8 is located 8 data blocks after DA0. On the other hand, values DBC=7 and syt=7000 are added to the packet 106a to be transmitted from the transmitting B node 102. DBC=12 is added to the packet 106b. Values DBC=16 and syt=F000 are added to the packet 106c.

One to three cables of IEEE 1394 are connected in each node to a physical layer IC (Integrated Circuit) of the physical layer. The physical layer IC is connected to a link layer controller IC that provides the link layer. The link layer controller IC is connected to an LSI (Large Scale Integration, hereafter referred to as a packet handler) for transmission of IEEE 1394 digital audio/MIDI. The packet handler executes the above-mentioned Audio and Music Data Transmission Protocol. In the transmission of event sequence data such as realtime audio and music data in the packet format of isochronous transmission mode, the time in which packets arrive at the receiving node and the interval of reception of these packets are not constant, because this mode is not synchronous. Therefore, it becomes necessary to regulate the reproduction of the received packets to the time specified by the transmit side and to output the reproduced audio data to a peripheral sound device in synchronization with the input sampling clock of the transmit side.

SUMMARY OF THE INVENTION

It is therefore an object of the present invention to provide a packet transfer apparatus for receiving packets containing event sequence data and generating a reproduction sampling clock.

It is another object of the present invention to provide a packet transfer apparatus for receiving packets containing event sequence data and reproducing them in synchronization with a time specified by the transmit side.

It is still another object of the present invention to provide a packet transfer apparatus for receiving packets containing event sequence data including audio and music data and adjusting, in association with each transmitting node, a reproduction time specified by a timestamp supplied from each transmitting node.

It is further another object of the present invention to provide a packet transfer apparatus capable of coping with occurrence of errors.

It is yet another object of the present invention to provide a packet transfer apparatus for sending and receiving packets containing event sequence data. When this packet transfer apparatus is used in plurality, a common reproduction timing clock can be shared among them.

It is a different object of the present invention to provide a packet transfer apparatus capable of sending and receiving, in a simple manner, packets containing sampling data having a sampling frequency two times as high as ordinary sampling frequency.

It is still different object of the present invention to provide a packet transfer apparatus for receiving packets each containing plural trains of event sequence data and changing output channels through which these event sequence data are outputted.

According to the invention, a packet receiving apparatus has a plurality of receiving buffers to receive packets from a plurality of transmitting nodes located on a network for reproduction of event sequence data through output channels, the packet containing at least one data block composed of at least one event sequence data and a timestamp added per a predetermined number of data blocks. The apparatus comprises an unpacketizing section that extracts the event sequence data and the timestamp from the packet, a writing section that distributes the extracted event sequence data to the plurality of receiving buffers for writing the event sequence data into the receiving buffers, and a reading section that reads out the event sequence data from the receiving buffers in accordance with the extracted timestamp.

Preferably, the plurality of the receiving buffers are separately allotted to the plurality of the transmitting nodes and are further assigned to channels of the event sequence data contained in each packet from each transmitting node, and the writing section distributes the event sequence data of one packet from one transmitting node to a corresponding one of the receiving buffers according to information which is contained in said one packet and which identifies said one transmitting node and the channel.

Preferably, the packet receiving apparatus further comprises a patch section that allocates the event sequence data read from the receiving buffers to the output buffers according to either of header information contained in the packet and setting information inputted from outside.

Preferably, the reading section includes a time adjusting section that operates when a target time indicated by the timestamp extracted from one packet coincides with a current time indicated by an internal cycle timer for reading out the event sequence data extracted from said one buffer and written in the receiving buffer to thereby adjusting a reproduction timing of the event sequence data by the timestamp.

According to the invention, a packet receiving apparatus has a plurality of receiving buffers to receive packets from a plurality of transmitting nodes located on a network for reproduction of event sequence data, the packet containing at least one data block composed of at least one event sequence data and a timestamp added per a predetermined number of data blocks. The apparatus comprises a timestamp output section that selects a predetermined one of packets which are received sequentially for retrieving a timestamp contained in the predetermined packet, a reproduction timing clock generating section that generates a reproduction timing clock used for synchronously reproducing the event sequence data contained in the sequentially received packets, a comparing section that compares a time indicated by the timestamp retrieved from the predetermined packet with a current time indicated by an internal cycle timer so as to phase-lock the reproduction timing clock to the time of the timestamp, and a data output section that reproduces the event sequence data contained in the sequentially received packets in synchronization to the reproduction timing clock.

Preferably, the timestamp output section selects a predetermined packet which is transmitted from a specific one of the transmitting nodes, and retrieves the timestamp from the selected packet to provide the retrieved timestamp to the comparing section.

Preferably, the timestamp output section comprises a first timestamp output section that retrieves a timestamp contained in a predetermined packet which is transmitted from a specific one of the transmitting nodes, and a second timestamp output section that retrieves another timestamp contained in a packet which is transmitted form other transmitting node than the specific transmitting node. The comparing section comprises a first comparing section that operates when a time indicated by the timestamp retrieved by the first timestamp output section coincides with the current time of the internal cycle timer for enabling the data output section to produce the event sequence data which is contained in the predetermined packet of the specific transmitting node and which corresponds to the timestamp retrieved by the first timestamp output section, and a second comparing section that operates when a time indicated by the timestamp retrieved by the second timestamp output section coincides with the current time of the internal cycle timer for enabling the data output section to produce the event sequence data which is contained in the packet of the other transmitting node than the specific transmitting node and which corresponds to the timestamp retrieved by the second timestamp output section.

According to the invention, a packet receiving apparatus has a plurality of data buffers to receive packets from a plurality of transmitting nodes located on a network for reproduction of event sequence data, the packet containing at least one data block composed of at least one event sequence data and a timestamp added per a predetermined number of data blocks. The apparatus comprises a pair of first and second timestamp buffers, an unpacketizing section that extracts event sequence data and timestamps from received packets, a writing section that distributes the extracted event sequence data to the plurality of the data buffers for writing the event sequence data into the data buffers, the writing section further writing a timestamp extracted from a particular packet into the first timestamp buffer and writing other timestamp extracted from other packet than the particular packet into the second timestamp buffer, and a reading section that reads out the event sequence data from the data buffers in accordance with the timestamps written in the first timestamp buffer and the second timestamp buffer.

Preferably, the packet receiving apparatus further comprises a reproduction timing clock generating section that generates a reproduction timing clock used for synchronous reproduction of the event sequence data from each of the packets, and a comparing section that compares a time indicated by the timestamp extracted from the particular packet transmitted from a particular one of the transmitting node and written into the first timestamp buffer with a current time indicated by an internal cycle timer for phase-locking the reproduction timing clock. The reading section reproduces the event sequence data from the data buffers in synchronization to the reproduction timing clock.

Preferably, the reading section includes a time adjusting section that operates when the time indicated by the timestamp written in the first timestamp buffer coincides with the current time indicated by the internal cycle timer for reading out first event sequence data of the particular packet from the data buffer to thereby adjust reproduction timing of the first event sequence data by the timestamp written in the first timestamp buffer, and that operates when the time indicated by the timestamp written in the second timestamp buffer coincides with the current time indicated by the internal cycle timer for reading out second event sequence data of the other packet than the particular packet from the data buffer to thereby adjust reproduction timing of the second event sequence data by the timestamp written in the second timestamp buffer.

According to the invention, a packet receiving apparatus is provided on a receiving node for receiving packets from a plurality of transmitting nodes located on a network, the packet containing at least one data block composed of at least one event sequence data and a timestamp added per a predetermined number of data blocks. The apparatus comprises a timestamp output section that retrieves a timestamp contained in a packet received from a transmitting node, a data output section that reproduces event sequence data contained in the same packet received from the transmitting node, an offset setting section that sets an offset time for the receiving node relative to the transmitting node and adds the offset time to a time indicated by the timestamp retrieved by the timestamp output section, and a reproduction time control section that operates when the time of the timestamp added with the offset time coincides with a current time indicated by an internal cycle timer for controlling the data output section to effect synchronous reproduction of the event sequence data contained in the same packet as the timestamp.

Preferably, the timestamp output section has a first timestamp buffer for storing a primary timestamp retrieved from a packet which is transmitted from a particular one of the transmitting nodes, and a second timestamp buffer for storing a secondary timestamp retrieved from another packet which is transmitted from other transmitting node than the particular transmitting node. The offset setting section adds the time indicated by the primary timestamp with an offset time set relative to the particular transmitting node, and adds the time indicated by the secondary timestamp with another offset time set relative to the other transmitting node.

Preferably, the timestamp output section adds an offset time, which is set by operating an external input provided on the receiving node, to the time indicated by the timestamp.

According to the invention, a packet receiving apparatus receives a packet from a transmitting node located on a network, the packet containing at least one data block composed of at least one event sequence data and a timestamp added per a predetermined number of data blocks. The apparatus comprises a reproduction timing clock generating section that generates a reproduction timing clock used for synchronous reproduction of the event sequence data contained in the packet based on the timestamp contained in the packet, an output terminal provided for outputting the generated reproduction timing clock externally, an input terminal provided for inputting an external reproduction timing clock, a data output section that reproduces event sequence data contained in the packet received from the transmitting node in synchronization to either of the generated reproduction timing clock and the external reproduction timing clock, and a reproduction timing clock setting section that operates in a first mode for feeding the reproduction timing clock generated by the reproduction timing clock generating section to the data output section and to the output terminal, and that operates in a second mode for feeding the external reproduction timing clock inputted from the input terminal to the data output section.

According to the invention, a packet receiving apparatus comprises a plurality of packet handlers including a master packet handler and a slave packet hander for cooperatively receiving packets from transmitting nodes located on a network, the packet containing at least one data block composed of at least one event sequence data and a timestamp added per a predetermined number of data blocks. Each packet handler comprises an unpacketizing section that extracts the event sequence data and the timestamp from the packet, a receiving buffer that is provided for temporarily storing the event sequence data, a writing section that writes the extracted event sequence data into the receiving buffer, and a reading section that reads out the event sequence data from the receiving buffer in synchronization to a reproduction timing clock to reproduce the event sequence data. The master packet handler generates the reproduction timing clock in accordance with the extracted timestamp and provides the generated reproduction timing clock to the slave packet handler. The master packet handler operates when the receiving buffer has no space to store the event sequence data for allocating the event sequence data to the receiving buffer of the slave packet handler.

According to the invention, a packet transmitting apparatus transmits packets to receiving nodes located on a network, the packet containing at least one data block composed of at least one event sequence data and a timestamp added per a predetermined number of data blocks. The packet transmitting apparatus comprises a packetizing section that arranges the event sequence data into data blocks and adds thereto a timestamp so as to sequentially produce packets, a transmitting section that sequentially transmits the packets, and an error processing section that operates when an error is detected during production of the packets for stopping transmission of a regular packet containing event sequence data and for generating and transmitting a special packet containing a message indicative of occurrence of the error.

Preferably, the error processing section includes an computation section that computes an input timing period of the data block based on a time of the timestamp, so that the error processing section operates when the computed input timing period deviates from a predetermined time period over an allowable range for detecting the error.

According to the invention, a packet receiving apparatus has a receiving buffer to receive packets from transmitting nodes located on a network for reproduction of event sequence data, the packet containing at least one data block composed of at least one event sequence data and a timestamp added per a predetermined number of data blocks. The apparatus comprises an unpacketizing section that extracts the event sequence data and the timestamp from the packet, a writing section that writes the extracted event sequence data into the receiving buffer, a reading section that reproduces the event sequence data from the receiving buffer in synchronization to the extracted timestamp, and an error processing section that operates when detecting occurrence of a timing error based on the extracted timestamp and other error in either of the writing section and the reading section for muting synchronous reproduction of the event sequence data.

According to the invention, a packet transmitting apparatus transmits packets to receiving nodes located on a network, the packet containing at least one data block composed of at least one event sequence data and a timestamp added per a predetermined number of data blocks. The packet transmitting apparatus comprises an input section that sequentially inputs event sequence data from an external data source in response to an input clock signal having a leading edge and a trailing edge arranged at a predetermined period, a fast packetizing section that generates a packet of the inputted event sequence data in response to the leading edge of the input clock signal and generates another packet in response to the trailing edge subsequent to the leading edge, thereby successively generating packets at a rate twice as fast as the input clock signal, and that adds the timestamp every time the predetermined number of data blocks are packetized, and a transmitting section that sequentially transmits the packets generated by the fast packetizing section.

Preferably, the input section sequentially inputs event sequence data which is sampled at a double rate by a sampling clock signal having a half period of the input clock signal.

Preferably, the input section can switch between a fast sampling mode where the event sequence data is sampled at a double rate by a sampling clock signal having a half period of the input clock signal and a regular sampling mode where the event sequence data is sampled at a regular rate by another sampling clock signal having the same period as the input clock signal, and further a regular packetizing section operates under the regular sampling mode for generating a packet of the inputted event sequence data in response to only one of the leading edge and the trailing edge of the input clock signal and adds the timestamp every time the predetermined number of data blocks are packetized by the regular packetizing section.

According to the invention, a packet receiving apparatus receives packets from transmitting nodes located on a network to reproduce event sequence data, the packet containing at least one data block composed of at least one event sequence data and a timestamp added per a predetermined number of data blocks. The packet receiving apparatus comprises a receiving section that sequentially receives packets transmitted from one or more of the transmitting node, a fast unpacketizing section that operates in response to a reproduction clock signal having a leading edge and a trailing edge arranged at a predetermined period for retrieving event sequence data from a packet at the leading edge of the reproduction clock signal and for retrieving event sequence data from a next packet at the trailing edge subsequent to the leading edge, thereby successively unpacketizing the packets at a rate twice as fast as the reproduction clock signal, and a data output section that reproduces the event sequence data in response to the reproduction clock signal which is synchronized to the timestamps contained in the received packets.

Preferably, the packet receiving apparatus further comprises a regular unpacketizing section that retrieves event sequence data from a packet at only one of the leading edge and the trailing edge of the reproduction clock signal, thereby successively unpacketizing the packets at the same rate as the reproduction clock signal, and a switching section that switches between the fast unpacketizing section and the regular unpacketizing section according to information which is contained in the received packets and which indicates a sampling period of the event sequence data.

According to the invention, a packet receiving apparatus receives packets from one or more of transmitting nodes located on a network, the packet containing at least one data block composed of at least one event sequence data and a timestamp added per a predetermined number of data blocks. The apparatus comprises a timestamp output section that retrieves a timestamp from a packet which is received from one of the transmitting nodes, a reproduction timing clock generating section that generates a reproduction timing clock used for synchronously reproducing the event sequence data contained in the received packet, a comparing section that compares a time indicated by the timestamp retrieved by the timestamp output section with a current time indicated by an internal cycle timer so as to phase-lock the reproduction timing clock to the time of the timestamp, and a data output section that reproduces the event sequence data contained in the received packets in synchronization to the reproduction timing clock.

According to the invention, a packet receiving apparatus receives packets from one or more of transmitting nodes located on a network, the packet containing at least one data block composed of at least one event sequence data and a timestamp added per a predetermined number of data blocks. The apparatus comprises a timestamp output section that retrieves a timestamp from a packet which is received from the transmitting node, a reproduction timing clock generating section that generates a reproduction timing clock which is synchronized to the retrieved timestamp, a data output section that reproduces the event sequence data contained in packets received from each transmitting node in response to the reproduction timing clock, and a time adjusting section that operates when a time indicated by the timestamp retrieved by the timestamp output section coincides with a current time indicated by an internal cycle timer for controlling the data output section to reproduce a data block of the event sequence data which is contained in the same packet as the timestamp and which corresponds to the time indicated by the timestamp. The data output section has a plurality of receiving buffers for writing therein the event sequence data, the receiving buffers being separately allotted to different transmitting nodes and further being assigned to different channels of the event sequence data contained in each packet, thereby reproducing the event sequence data from the receiving buffers a channel by channel in response to the reproduction timing clock.

According to the invention, a packet receiving apparatus receives a packet from one or more of transmitting node located on a network, the packet containing at least one data block composed of at least one event sequence data and a timestamp added per a predetermined number of data blocks. The apparatus comprises a reproduction timing clock generating section that generates a reproduction timing clock in synchronization to the timestamp contained in the packet, a data output section that reproduces each data block of event sequence data contained in the packet received from the transmitting node in response to the reproduction timing clock, and an output terminal provided to output the generated reproduction timing clock for external use of the reproduction timing clock.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

These and other objects of the invention will be seen by reference to the description, taken in connection with the accompanying drawings, in which.

DETAILED DESCRIPTION OF PREFERRED EMBODIMENTS

This invention will be described in further detail by way of example with reference to the accompanying drawings.

Figure 1:
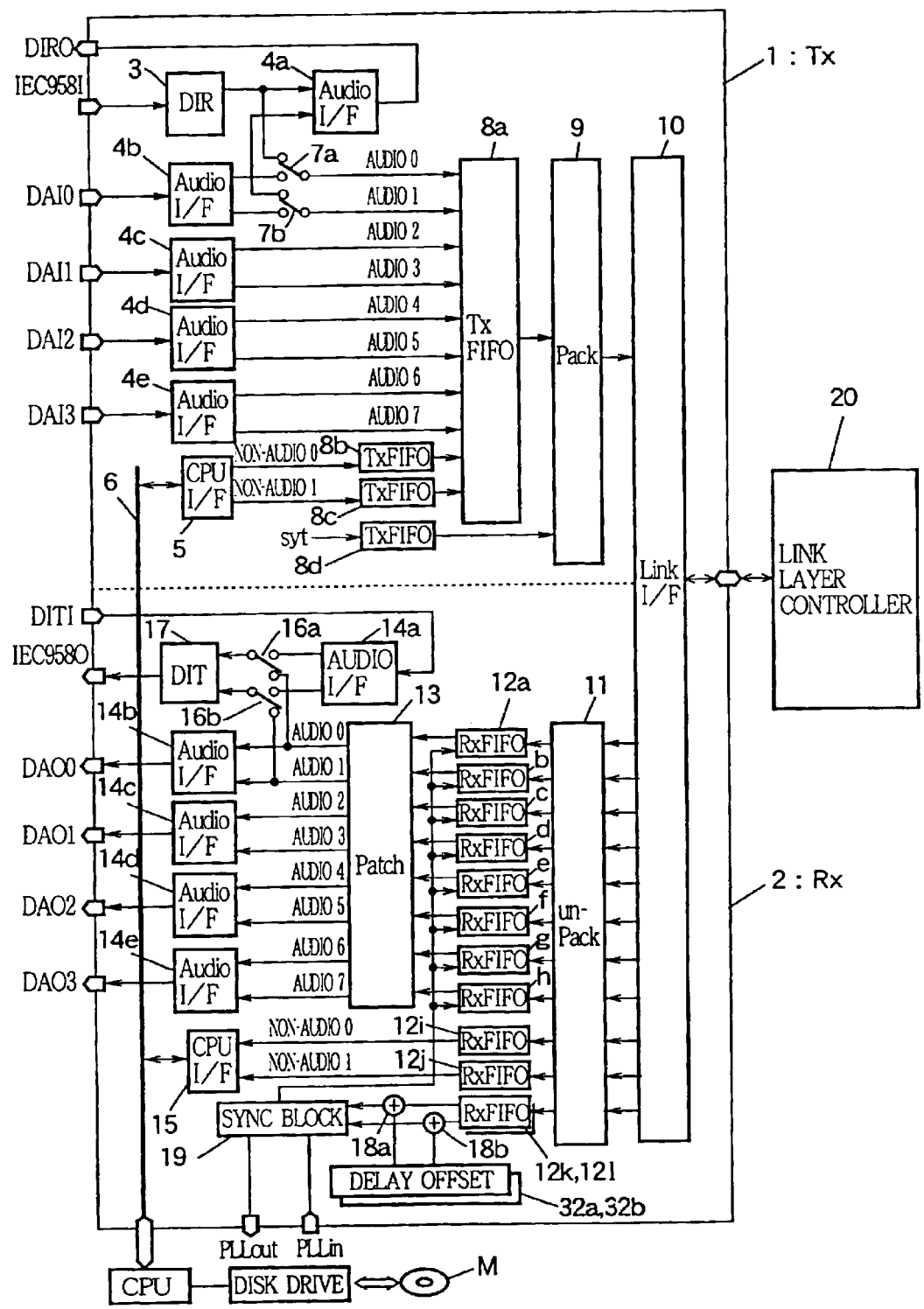
FIG. 1 is a functional block diagram illustrating a packet handler practiced as one embodiment of a packet transfer apparatus according to the invention.

Now, referring to FIG. 1, reference numeral 1 denotes a transmit block, 2 denotes a receive block, 3 denotes a DIR (Digital audio Receiver), 4a through 4e denote audio interfaces, 5 denotes a CPU (Central Processing Unit) interface, 6 denotes a CPU bus, 7a and 7b denote switching blocks, 8a denotes a transmitting FIFO (First In First Out) of all channels, 8b and 8c denote transmitting FIFOs for non-audio data, 8d denotes a transmitting FIFO for timestamp, 9 denotes a packetizing block, and 10 denotes a link interface.

Reference numeral 11 denotes an unpacketizing block, 12a through 12h denote receiving FIFOs for audio data, 12i and 12j denote receive buffers for non-audio data, 12k and 12l denote receive buffers for timestamp, 13 denotes a patch block, 14a through 14e denote audio interfaces, 15 denotes a CPU interface, 16a and 16b denote switching blocks, 17 denotes a DIT (Digital audio Transmitter), 18a and 18b denote adders, 19 denotes a synchronizing block, 20 denotes a link layer controller, and 32a and 32b denote delay offset registers. Although not shown in this diagram, each function is executed by running necessary programs on the basis of hardware such as a CPU and a memory device.

In the transmit block 1, eight channels of audio data outputted from a digital audio device such as a mixer are inputted in the audio interfaces 4b through 4e through input terminals DAI0 through DAI3. The input terminals DAI0 through DAI3 each multiplex two channels of audio data in a time division manner. Sometimes, IEC 958 data are inputted from an input terminal IEC958I through the DIR 3 instead of the input terminal DAI0 by the switching blocks 7a and 7b. The output of the DIR 3 is supplied to an output terminal DIR0 through the audio interface 4a.

On the other hand, MIDI data are inputted from a MIDI interface of a main CPU (not shown) into transmitting FIFOs 8b and 8c through the CPU bus 6 and the CPU interface 5. The outputs of the audio interfaces 4b through 4e (audio0 through audio7) and the outputs of the transmitting FIFOs 8b and 8c are inputted in the transmitting FIFO 8a. The FIFO is used to store data sequentially at write request and sequentially read the stored data in the order of storage or on a first-in first-out basis in response to a read request occurring asynchronously with the write request. These FIFOs are used as means of implementing a buffer capability.

The timestamp (syt) is inputted in the transmitting FIFO 8d at every 8 data blocks. The output of the transmitting FIFO 8a is inputted in the packetizing block 9 along with the output of the transmitting FIFO 8d. The packetized data are attached with a header, and the resultant packets are inputted in the link interface 10. The link interface 10 outputs the packets to the link layer controller 20. The link layer controller 20 exchanges the packets with the packet handler through a 16-bit isochronous bus.

The packets transmitted from plural transmit nodes are inputted in the link interface 10 through the link layer controller 20. From the link interface 10, the packets are inputted in the unpacketizing block 11 to be unpacketized on the basis of the header information and so on. The packets are analyzed and the resultant multiple trains of audio data are temporarily stored in the receiving FIFOs 12a through 12j, respectively. On the basis of the isochronous transfer channel written in the packet header, only the packets from desired channels may be processed for reception.

By use of the time information of the received timestamp syt, the time of reproducing the received audio data is set to the time of the cycle timer of the receive block 2, and the received data are outputted to a peripheral device at a reproduction timing clock synchronized with the input sampling clock of the transmit side. For this purpose, audio receiving FIFOs 12a through 12h and first and second timestamp receiving FIFOs 12k and 12l are provided.

The audio data extracted from the packet by the unpacketizing block 11 are written to the audio receiving FIFOs 12a through 12h. Likewise, non-audio channel data are also written to non-audio receiving FIFOs 12i and 12j. The timestamps extracted from the packets are written to the first timestamp receiving FIFO 12k or the second timestamp receiving FIFO 12l. The timestamps read from these FIFOs are each added at an adder 18a or 18b with a predetermined offset value which is set for each transmitting node and stored in delay offset register 32a or 32b. The resultant timestamps are then inputted in the synchronizing block 19. The synchronizing block 19 controls the timing and pointer for reading the audio data from the audio receiving FIFOs 12a through 12h. The synchronizing block 19 has a external output terminal PLLout and an external input terminal PLLin for exchanging reproduction sampling clocks. The operation of the synchronizing block 19 will be described in detail with reference to FIGS. 2 through 4.

The audio receiving FIFO 12a through 12h are provided for different transmitting nodes and different audio channels. Hence, if audio channels separated from the packets supplied from different transmitting nodes exist in a mixed manner, this arrangement of the audio receiving FIFOs 12a through 12h facilitates not only the independent read start and synchronous reproduction for each channel but also the flexible change of the number of channels for the updated specifications of the packet handler.

The outputs of the audio receiving FIFO 12a through 12h are inputted in the patch block 13. The patch block 13 assigns the audio data read from the eight audio receiving FIFOs 12a through 12h to audio channels (audio0 through audio7). These eight channels of audio data are multiplexed in a time division manner in units of two channels, and the multiplexed audio data are outputted from the audio interfaces 14b through 14e. The patch block 13 executes this assignment by determining, from the information in the header extracted in the unpacketizing block 11, a kind of audio channel, a name of transmitting node, and a format of the data block of the packet.

It should be noted that the patch block 13 can also be controlled externally by use of a setting control arranged outside of this packet handler. For example, the patch block 13 can be externally controlled so as to switch received audio data to an output terminal other than an initially specified output terminal or supply one train of received audio data to two or more output terminals at a time. These user settings are supported by the above-mentioned arrangement in which the audio receiving FIFOs 12a through 12h are provided for different transmitting nodes and different audio channels.

On the other hand, the 2 channels of data outputted from the non-audio receiving FIFOs 12i and 12j are inputted in a MIDI input/output interface of the external CPU, not shown, through the CPU interface 15 and the CPU bus 6. It should be noted that, when the data for IEC 958 are received, the two audio channels (audio0 and audio1) are outputted to the output terminal IEC9580 through the switching blocks 16a and 16b and the DIT 17. It should be noted that, when the switching blocks 16a an 16b are switched in the other direction, the audio data from the input terminal DIT1 are outputted to the DIT 17 through the audio interface 14a.

Figure 6:
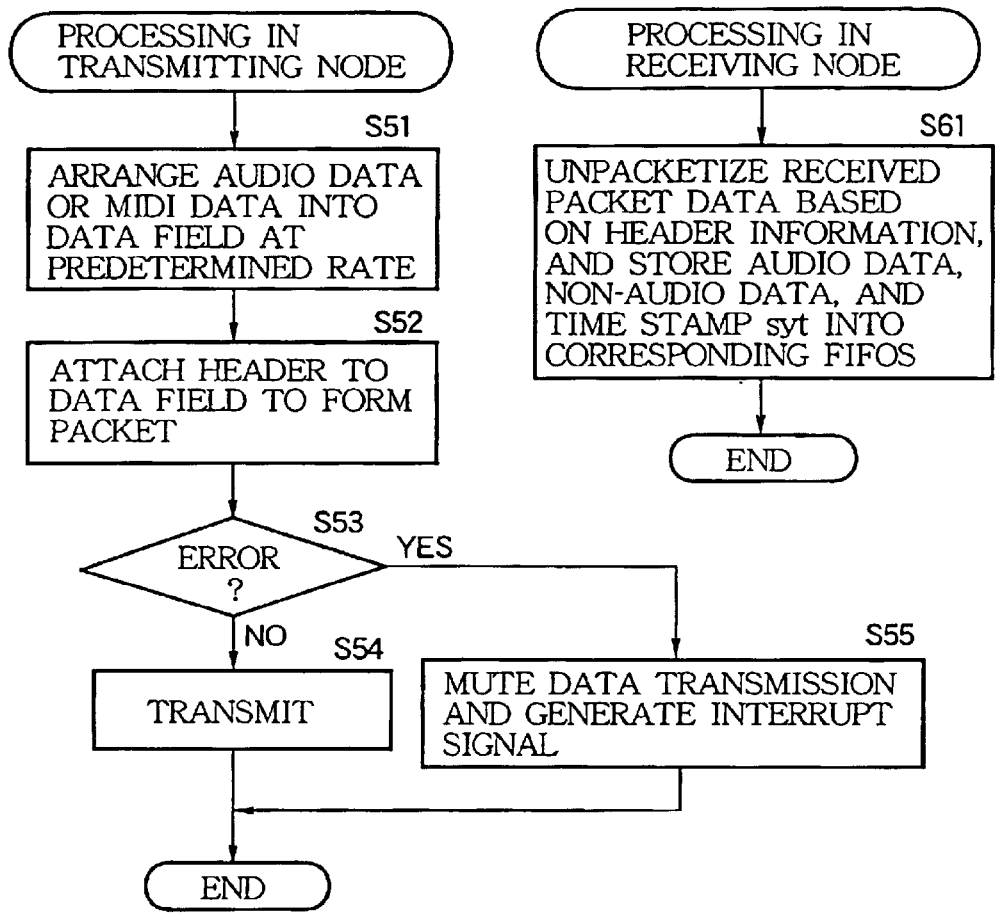
FIGS. 6(a) and 6(b) are flowcharts describing an operational outline of the packet handler shown in FIG. 1.

FIG. 6(a) shows a flowchart for outlining the processing by the packet handler as a transmitting node. FIG. 6(b) shows another flowchart outlining the processing by the packet handler as a receiving node. In the transmitting node processing shown in FIG. 6(a), in step S51, plural traines of audio data are captured from the external input terminals DAI0 through DAI3 at a predetermined sampling rate, and the captured data are formed into one data block. Plural data blocks thus formed are gathered or collected into a data field. In the case of MIDI data, the data are captured from the MIDI interface of the external CPU through the CPU bus. In step S52, a header is formed and attached to the data field to form a packet.

In step S53, it is determined whether a processing error has occurred in the transmit block. If the decision is no, the system proceeds to step S54. If an error is found, the system proceeds to step S55. The processing error includes, for example, a case where a difference between the period of a data input sampling clock on the basis of the timestamp and a preset sampling clock period exceeds an allowable range. In step S54, packet transmission is executed. In step S55, the data transmission is muted by pausing the normal packet transmission, and an interrupt packet for error report is transmitted to generate an interrupt signal on the receiving node side.

Namely, the inventive packet transmitting apparatus transmits packets to receiving nodes located on a network, the packet containing at least one data block composed of at least one event sequence data and a timestamp added per a predetermined number of data blocks. In the packet transmitting apparatus, the packetizing section 9 arranges the event sequence data into data blocks and adds thereto a timestamp so as to sequentially produce packets. The transmitting section 10 sequentially transmits the packets. An error processing section operates when an error is detected during production of the packets for stopping transmission of a regular packet containing event sequence data and for generating and transmitting a special packet containing a message indicative of occurrence of the error. The error processing section includes an computation section that computes an input timing period of the data block based on a time of the timestamp, so that the error processing section operates when the computed input timing period deviates from a predetermined time period over an allowable range for detecting the error.

On the other hand, the inventive packet receiving apparatus has a receiving buffer 12a to receive packets from transmitting nodes located on a network for reproduction of event sequence data, the packet containing at least one data block composed of at least one event sequence data and a timestamp added per a predetermined number of data blocks. In the inventive apparatus, the unpacketizing section 11 extracts the event sequence data and the timestamp from the packet. The writing section writes the extracted event sequence data into the receiving buffer. The reading section reproduces the event sequence data from the receiving buffer in synchronization to the extracted timestamp. An error processing section operates when detecting occurrence of a timing error based on the extracted timestamp and other error in either of the writing section and the reading section for muting synchronous reproduction of the event sequence data.

In the receiving node processing shown in FIG. 6(b), in step S61, the received packets are unpacketized on the basis of the header information. Then, the resultant audio data, non-audio data, and timestamp are stored in the receiving FIFOs 12a through 12h, 12i and 12j, and 12k and 12l, respectively. In doing so, the write pointers (WPs) of these receiving FIFOs are controlled. Namely, the inventive packet receiving apparatus has a plurality of receiving buffers 12a–12h to receive packets from a plurality of transmitting nodes located on a network for reproduction of event sequence data through output channels, the packet containing at least one data block composed of at least one event sequence data and a timestamp added per a predetermined number of data blocks. In the inventive apparatus, the unpacketizing 11 section extracts the event sequence data and the timestamp from the packet. The writing section distributes the extracted event sequence data to the plurality of the receiving buffers for writing the event sequence data into the receiving buffers. The reading section reads out the event sequence data from the receiving buffers in accordance with the extracted timestamp.

Figure 2:
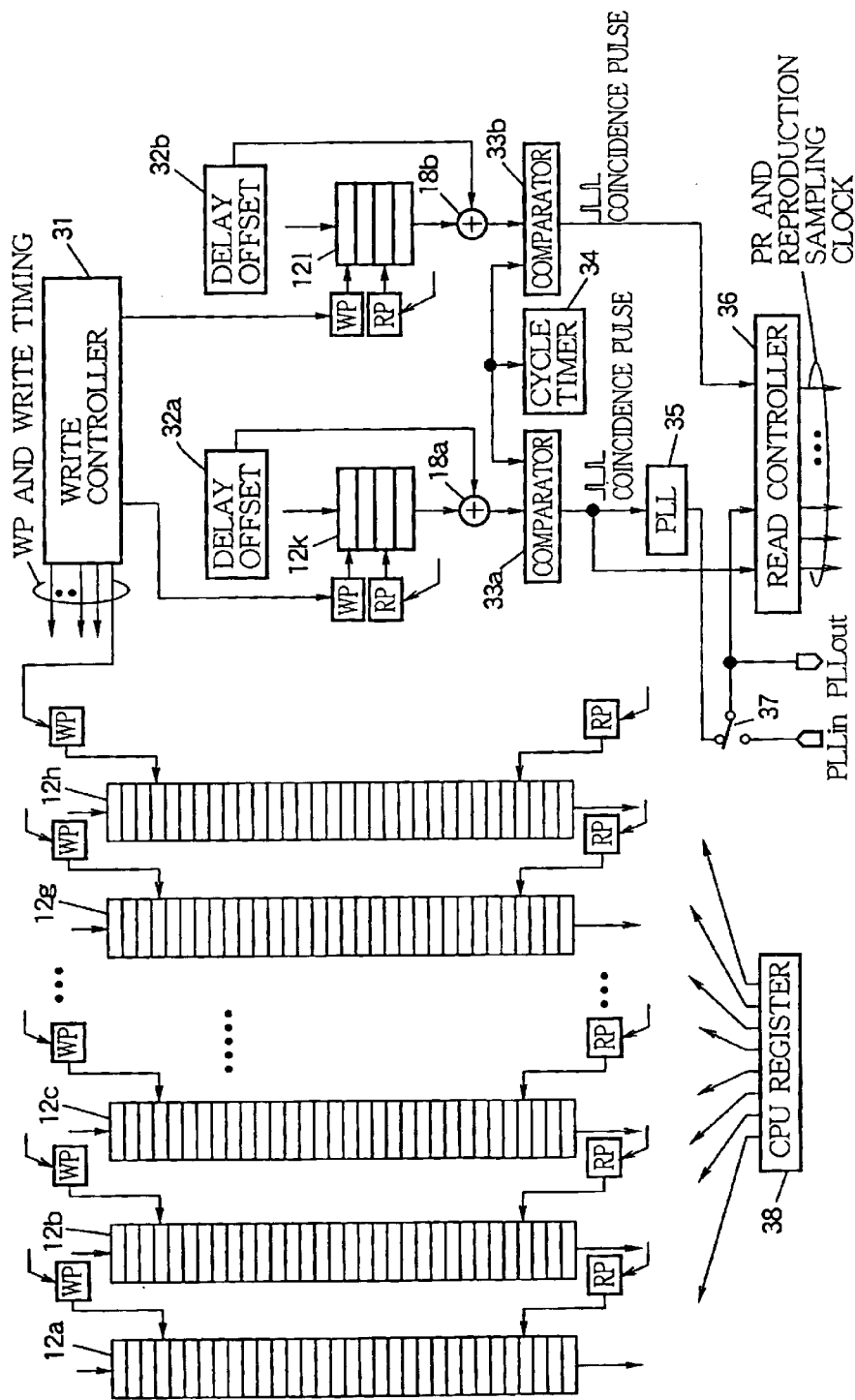
FIG. 2 is a block diagram illustrating reproduction processing to be executed at a receiving node of the packet handler shown in FIG. 1.

The following describes the reproduction processing at the receiving node by the packet handler with reference to FIG. 2. Referring to FIG. 2, components similar to those previously described with reference FIG. 1 are denoted by the same reference numerals and the descriptions of those components will be skipped. The synchronizing block 19 shown in FIG. 1 corresponds to comparators 33a and 33b, a cycle timer 34, a PLL (Phase Locked Loop) 35, a read controller 36, a switching block 37, and a CPU register 38 shown in FIG. 2. Reference numeral 31 denotes a write controller. The cycle timer 34 is incorporated in the packet handler or arranged outside thereof.

The packetized audio data are supplied from one or more transmitting nodes. The audio receiving FIFOs 12a through 12h are assigned individually to different ones of the audio channels contained in the packets supplied from one transmitting node. Different FIFOs are assigned to audio channels of different transmitting nodes.

In the receiving node, the received audio data are outputted at a reproduction sampling clock synchronized with the input sampling clock used in the transmitting node. The input sampling clock used in the transmitting node is synchronously reproduced for data restoration on the basis of the time of the supplied timestamp. Each transmitting node inserts a timestamp in a predetermined header field of each packet and transmits the packets. The sampling clock may be synchronously reproduced, for each transmitting node, by use of the timestamp supplied from each transmitting node. This synchronous reproduction is executed by use of the timestamp included in the packet of one of the transmitting nodes, for example the transmitting A node 101 that has first acknowledged by the receiving node. In what follows, the first transmitting node that has transmitted the timestamp for synchronously reproducing a sampling clock is referred to as "synchronous reproduction reference node" for convenience.

Namely, the inventive packet receiving apparatus has a plurality of receiving buffers 12a–12h to receive packets from a plurality of transmitting nodes located on a network for reproduction of the event sequence data. In the inventive apparatus, the timestamp output section 36 selects a predetermined one of packets which are received sequentially for retrieving a timestamp contained in the predetermined packet. The reproduction timing clock generating section 35 generates a reproduction timing clock used for synchronously reproducing the event sequence data contained in the sequentially received packets. The comparing section 33a compares a time indicated by the timestamp retrieved from the predetermined packet with a current time indicated by an internal cycle timer 34 so as to phase-lock the reproduction timing clock to the time of the timestamp. The data output section 36 reproduces the event sequence data contained in the sequentially received packets in synchronization to the reproduction timing clock. The timestamp output section 36 selects a predetermined packet which is transmitted from a specific one of the transmitting nodes, and retrieves the timestamp from the selected packet to provide the retrieved timestamp to the comparing section 33a.

The write controller 31 outputs values of the write pointers (WPs) and write timing signals for the first and second timestamp receive buffers 12k and 12l as well as the audio receiving FIFOs 12a through 12h. The write controller 31 increments the write pointer for the first timestamp receive buffer 12k every time the timestamp supplied from the synchronous reproduction reference node is written to the first timestamp receiver FIFO 12k. On the other hand, the write controller 31 computes the value of the write pointer for an audio receiving FIFO assigned to the transmitting node coupled to the first timestamp receiving FIFO 12k on the basis of the value of the write pointer of the first timestamp receiving FIFO 12k. The write controller 31 sequentially writes the data of eight data blocks (corresponding to 8 sampling blocks) to the audio receiving FIFO. The write controller 31 increments the write pointer for the second timestamp receiving FIFO 12l for time correction or adjustment every time a timestamp supplied from one transmit note is written to the second timestamp receiving FIFO 12l. The write controller 31 increments the write pointer for an audio receiving FIFO assigned to a transmitting node coupled to this second timestamp receiving FIFO 12l every time a timestamp is written to the second timestamp receiving FIFO 12l.

Namely, the inventive packet receiving apparatus has a plurality of data buffers 12a–12b and a pair of first and second timestamp buffers 12k, 12l to receive packets from a plurality of transmitting nodes located on a network for reproduction of event sequence data. In the inventive apparatus, the unpacketizing section 11 extracts event sequence data and timestamps from received packets. The writing section 31 distributes the extracted event sequence data to the plurality of the data buffers 12a–12h for writing the event sequence data into the data buffers. The writing section 31 further writes a timestamp extracted from a particular packet into the first timestamp buffer 12k and writes other timestamp extracted from other packet than the particular packet into the second timestamp buffer 12k. The reading section 36 reads out the event sequence data from the data buffers 12a–12h in accordance with the timestamps written in the first timestamp buffer 12k and the second timestamp buffer 12l.

For simplicity, the following description is made by use of an example in which the value held in the delay offset register 32a is 0 and therefore the example is equivalent to a case having no adder 18a. A comparator 33a compares the time of the timestamp already read from the timestamp receiving FIFO 12k with the time of the cycle timer 34 in the receiving node. If both of the times are found matching, the comparator 33a outputs a coincidence pulse to the PLL 35 and the read controller 36.

Receiving the coincidence pulse, the PLL 35 controls the frequency of an incorporated VCO (Voltage Controlled Oscillator) such that its output phase becomes zero. This VCO is designed to self run in a period about ⅛ of the coincidence pulse (determined by timestamp interval). The PLL 35 synchronizes in phase the VCO output with the coincidence pulse, thereby synchronously reproducing the sampling clock exactly in a period of ⅛ of the time interval of successive timestamp read from the first timestamp receiving FIFO 12k. The time interval of the coincidence pulse is equivalent to the time difference of the adjacent timestamps, so that the coincidence pulse is multiplied by 8 to provide the reproduction sampling clock. It should be noted that the PLL 35 may not perform phase synchronization every time the coincidence pulse is outputted; the PLL 35 may perform phase synchronization with appropriately thinned out coincidence pulses. The reproduction sampling pulse generated in the PLL 35 is supplied to the read controller 36 and to the reproduction sampling clock output terminal PLLout through the switching block 37. As described above, the reproduction timing clock generating section 35 generates a reproduction timing clock used for synchronous reproduction of the event sequence data from each of the packets. The comparing section 33a compares a time indicated by the timestamp extracted from the particular packet transmitted from a particular one of the transmitting node and written into the first timestamp buffer 12k with a current time indicated by the internal cycle timer 34 for phase-locking the reproduction timing clock, whereby the reading section 36 reproduces the event sequence data from the data buffers 12a–12h in synchronization to the reproduction timing clock.

The read controller 36 outputs the values of read pointers (RPs) and read timing signals for the first and second timestamp receive buffers 12k and 12l, and for the audio receiving FIFOs 12a through 12h. Assume here that the audio data supplied from the transmit A node 101, which is the synchronous reproduction reference node, are temporarily stored in the audio receiving FIFOs 12a and 12b. The read controller 36 increments the read pointer of the first timestamp receiving FIFO 12k every time the comparator 33a generates a coincidence pulse, thereby reading a next timestamp. At the same time, when the comparator 33a generates a coincidence pulse for the first time, the read controller 36 computes the values of the read pointers for the assigned audio receiving FIFOs 12a and 12b for time correction (or time adjustment) so as to start reading of a data block corresponding to the time of the timestamp read from the first timestamp receiving FIFO 12k, thereby reading the data block. Subsequently, the read controller 36 increments the read pointer by the reproduction sampling clock outputted from the PLL 35, thereby reading subsequent data blocks.

Consequently, after a timing at which the time of the timestamp of the transmitting node 101 matches the time of the cycle timer 34 of the receiving node for the first time, the audio data supplied from the transmitting node 101 synchronizes with the reproduction sampling clock of the PLL 35 synchronized with the cycle timer 34, and the audio data are read from the audio receiving FIFOs 12a and 12b. It should be noted that, before this timing, by incrementing the read pointers of the audio receiving FIFOs 12a and 12b for each reproduction sampling clock, audio data of which time is not guaranteed or adjusted may also be read and outputted in advance.

On the other hand, assume that audio data supplied from another transmitting B node 102, which is not the synchronous reproduction reference node, are temporarily held in the audio receiving FIFOs 12c and 12d, for example. The read pointers of the FIFOs 12c and 12d are corrected (or adusted in time) by the second timestamp receiving FIFO 12l. The bit positions of the CPU register 38 correspond to the audio receiving FIFOs 12a through 12h one to one. The audio receiving FIFO corresponding to a flag bit is corrected in time by the second timestamp receiving FIFO 12l. As described, according to the invention, the timestamp output section 36 comprises a first timestamp output section 12k that retrieves a timestamp contained in a predetermined packet which is transmitted from a specific one of the transmitting nodes, and a second timestamp output section 12l that retrieves another timestamp contained in a packet which is transmitted form other transmitting node than the specific transmitting node. The comparing section comprises a first comparing section 33a that operates when a time indicated by the timestamp retrieved by the first timestamp output section coincides with the current time of the internal cycle timer 34 for enabling the data output section 36 to produce the event sequence data which is contained in the predetermined packet of the specific transmitting node and which corresponds to the timestamp retrieved by the first timestamp output section, and a second comparing section 36 that operates when a time indicated by the timestamp retrieved by the second timestamp output section coincides with the current time of the internal cycle timer 34 for enabling the data output section 36 to produce the event sequence data which is contained in the packet of the other transmitting node than the specific transmitting node and which corresponds to the timestamp retrieved by the second timestamp output section 12l. Further, the reading section 36 includes a time adjusting section that operates when the time indicated by the timestamp written in the first timestamp buffer 12k coincides with the current time indicated by the internal cycle timer 34 for reading out first event sequence data of the particular packet from the data buffer 12a–12h to thereby adjust reproduction timing of the first event sequence data by the timestamp written in the first timestamp buffer 12k, and that operates when the time indicated by the timestamp written in the second timestamp buffer 12l coincides with the current time indicated by the internal cycle timer 34 for reading out second event sequence data of the other packet than the particular packet from the data buffer 12a–12h to thereby adjust reproduction timing of the second event sequence data by the timestamp written in the second timestamp buffer 12l.

If the number of audio receiving FIFOs subjected to the read pointer correcting operation is limited to one at a time, one flag bit may be shifted sequentially to each bit position of the CPU register 38, thereby resulting in a rather simple configuration. However, performing a read pointer correcting operation simultaneously on one or more audio receiving FIFOs 12c and 12d temporarily storing event sequences supplied from the same transmitting node can reduce the correction time. The following example illustrates this case.

For example, the timestamp supplied from the transmitting B node 102 is written to the second timestamp receiving FIFO 12l. The audio data supplied from the transmitting B node 102 have been written to the receiving FIFOs 12c and 12d. For simplicity, it is assumed here that the value held in the delay offset register 32b is 0 and therefore the adder 18b is not used.

The comparator 32b compares the time of the timestamp read from the second timestamp receiving FIFO 12l with the time of the cycle timer 34. If both of the times are found matching, the comparator 32b outputs a coincidence pulse. This coincidence pulse is outputted to the read controller 36. The read controller 36 increments the read pointer of the second timestamp receiving FIFO 12l every time the coincidence pulse is generated. At the same time, when the comparator 33b generates a coincidence pulse for the first time, the read controller 36 computes the values of the read pointers for the audio receiving FIFOs 12c and 12d for time correction so as to start reading of a particular data block corresponding to the time of the timestamp read from the second timestamp receiving FIFO 12l, thereby reading the data block. Subsequently, the read controller 36 increments the read pointer by the reproduction sampling clock outputted from the PLL 35, thereby reading subsequent data blocks.

Consequently, after a timing at which the time of the timestamp of the transmitting node 102 matches the time of the cycle timer 34 of the receiving node for the first time, the audio data supplied from the transmitting node 102 synchronizes with the reproduction sampling clock of the PLL 35 synchronized with the cycle timer 34, and the audio data are read from the audio receiving FIFOs 12c and 12d. It should be noted that, before this timing, by incrementing the read pointers of the audio receiving FIFOs 12c and 12d for each reproduction sampling clock, audio data of which time is not guaranteed may be read and outputted in advance.

Once the time-adjusted read pointer has been obtained, subsequently the pointer may only be incremented for every reproduction sampling clock unless out-of-synchronism occurs. Consequently, when audio data supplied from still another transmitting node 103, for example, are temporarily stored in the audio receiving FIFOs 12e and 12f, the capability of the second timestamp receiving FIFO 12l is switched to the correction of the read pointers of the audio receiving FIFOs 12e and 12f.

To be more specific, the timestamp supplied from the transmitting C node 103 is written to the second timestamp receiving FIFO 12l. The comparator 33b compares the time of the timestamp read from the second timestamp receiving FIFO 12l with the time of the cycle timer 34. If both of the times are found matching, the comparator 33b outputs a coincidence pulse to the read controller 36. The read controller 36 increments the read pointer of the second timestamp receiving FIFO 12l. At the same time, when the comparator 33b generates a coincidence pulse for the first time after the switching to the time correction of the read pointers of the audio receiving FIFOs 12e and 12f, the read controller 36 computes the values of the read pointers for the audio receiving FIFOs 12e and 12f for time correction so as to accurately start reading of a data block corresponding to the time of the timestamp read from the second timestamp receiving FIFO 12l, thereby reading the data block. Consequently, after the timing at which the time of the timestamp supplied from the transmitting C node 103 has matched the time of the cycle timer 34 of the receiving node for the first time, the audio data supplied from the transmitting node 103 are also synchronized with the reproduction sampling clock supplied from the PLL 35 synchronized with the cycle timer 34, and the audio data are read from the audio receiving FIFOs 12e and 12f.

As described above, the same number of timestamp receiving FIFOs as the number of audio receiving FIFOs need not be provided. By use of the time of the cycle timer 34 of the receiving node as reference, the audio data supplied from each transmitting node can be outputted at the time specified by the timestamp syt. In addition, the audio data can be outputted at the reproduction sampling clock synchronized with the input sampling clock of each transmitting node. As a result, the synchronization can be achieved with an accuracy in the order of one sampling clock.

In the above description, the read controller 36 increments the read pointer of the second timestamp receiving FIFO 12l every time the second comparator 33b generates a coincidence pulse. However, if the second timestamp receiving FIFO 12l is used to match the audio data written in an audio receiving FIFO with the time of the cycle timer 34 only once for the first time, the timestamp from that transmission node need not be read for the generation of a coincidence pulse after the timing at which the time matching is achieved.

In the above example, the correction for time matching is executed when the time of the timestamp read from the first and second timestamp receiving FIFOs 12k and 12l matches with the time of the cycle timer 34 at one time. For more strict time matching, the correction may be performed under a condition that the time of the read timestamp matches the time of the cycle timer 34 several times consecutively. Alternatively, after the correction is performed once, data blocks may be read for the time being from the audio receiving FIFOs 12a through 12h at the reproduction sampling clock synchronized with the input sampling clock. Then, after passing of a predetermined time, the correction for time matching may be performed when the time of the read timestamp matches the time of the cycle timer 34. Thus, determination of the time match is made only once, or several times consecutively, or several times intermittently. Desired mode may be adopted appropriately according to the degree of accuracy of the time control practically required. Conversely, in a household application requiring no strict time control, time matching need not be performed, and only the capability of obtaining the reproduction sampling clock synchronized with the input sampling clock may be provided. In this case, neither the second timestamp receiving FIFO 12l nor the second comparator 33b is required.

In the above-mentioned example, the first and second timestamp receiving FIFO 12k and 12l and the first and second comparators 33a and 33b operate simultaneously, so that the audio data supplied from two transmitting nodes may be matched in time. In addition, provision of one or more FIFOs similar to the second timestamp receiving FIFO 12l can increase the number of channels of the audio data which can be simultaneously matched in time, thereby reducing the time required for time matching. Also, a FIFO similar to the second timestamp receiving FIFO 12l may be assigned to each of the audio receiving FIFOs 12a through 12h without making distinction whether the trains of audio data are from the same transmitting node or not.

Figure 3:
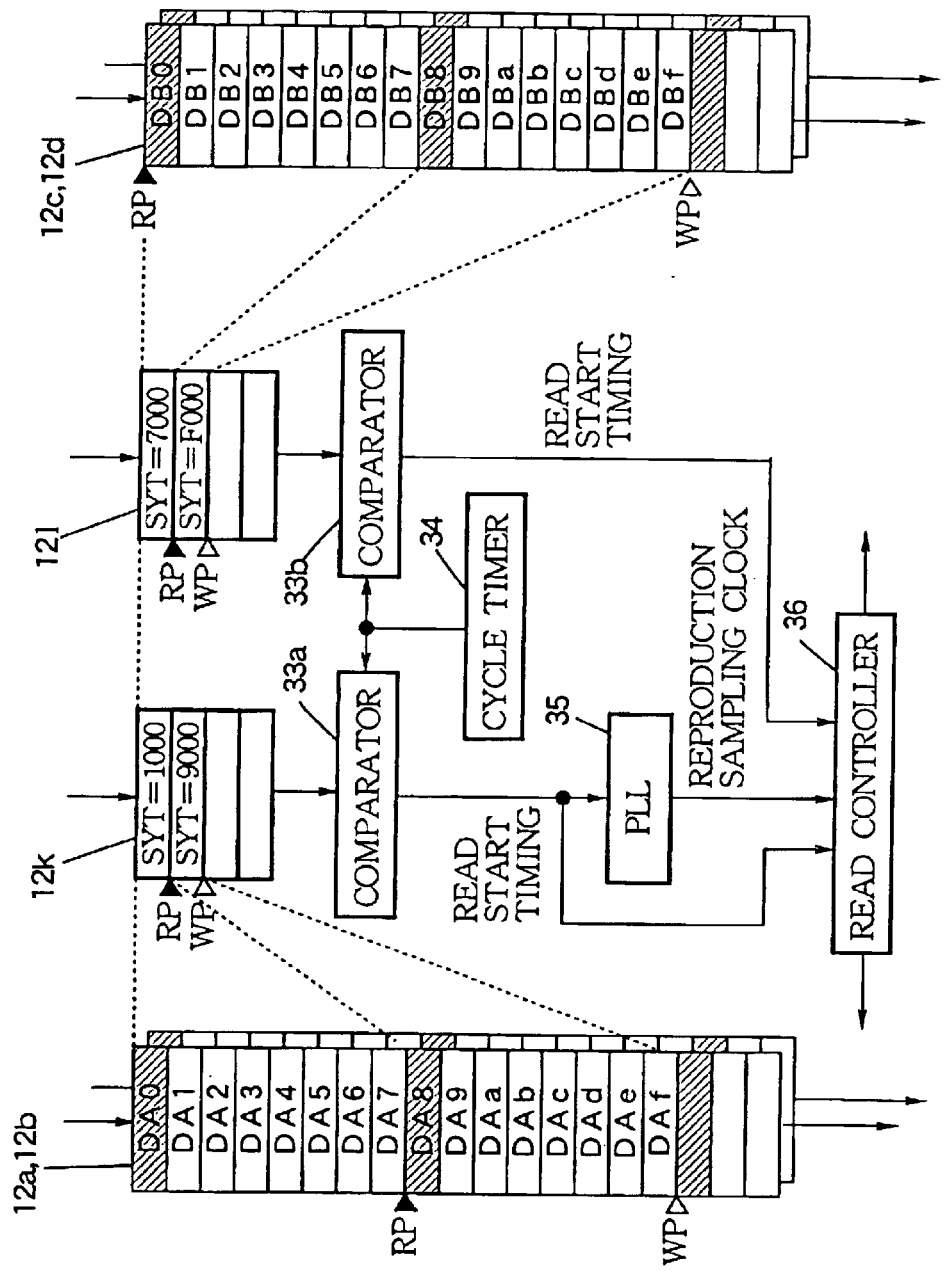
FIG. 3 is a diagram illustrating an exemplary operation shown in FIG. 2.
Figure 4:
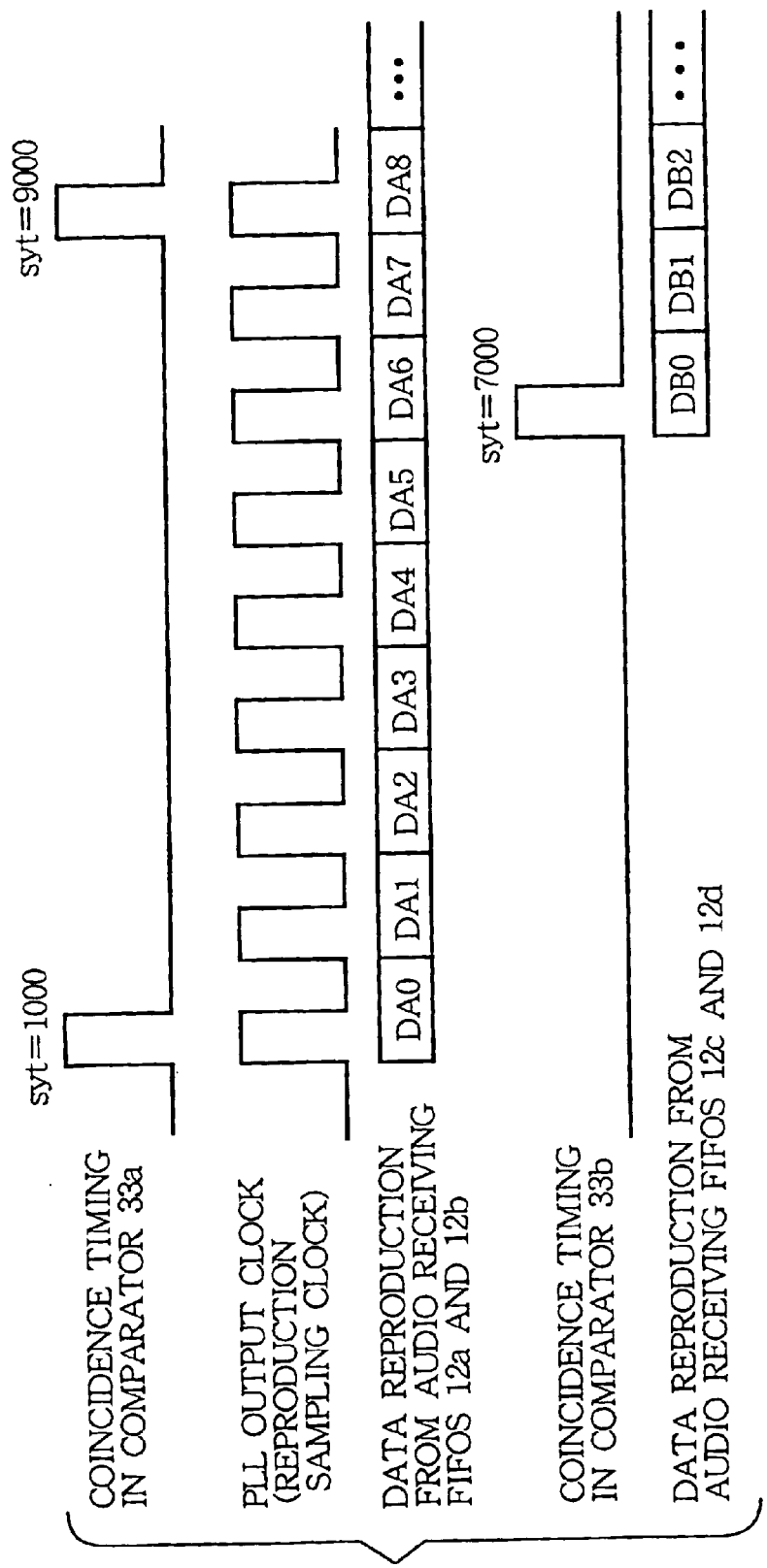
FIG. 4 is a diagram illustrating another exemplary operation shown in FIG. 2.
Figure 7:
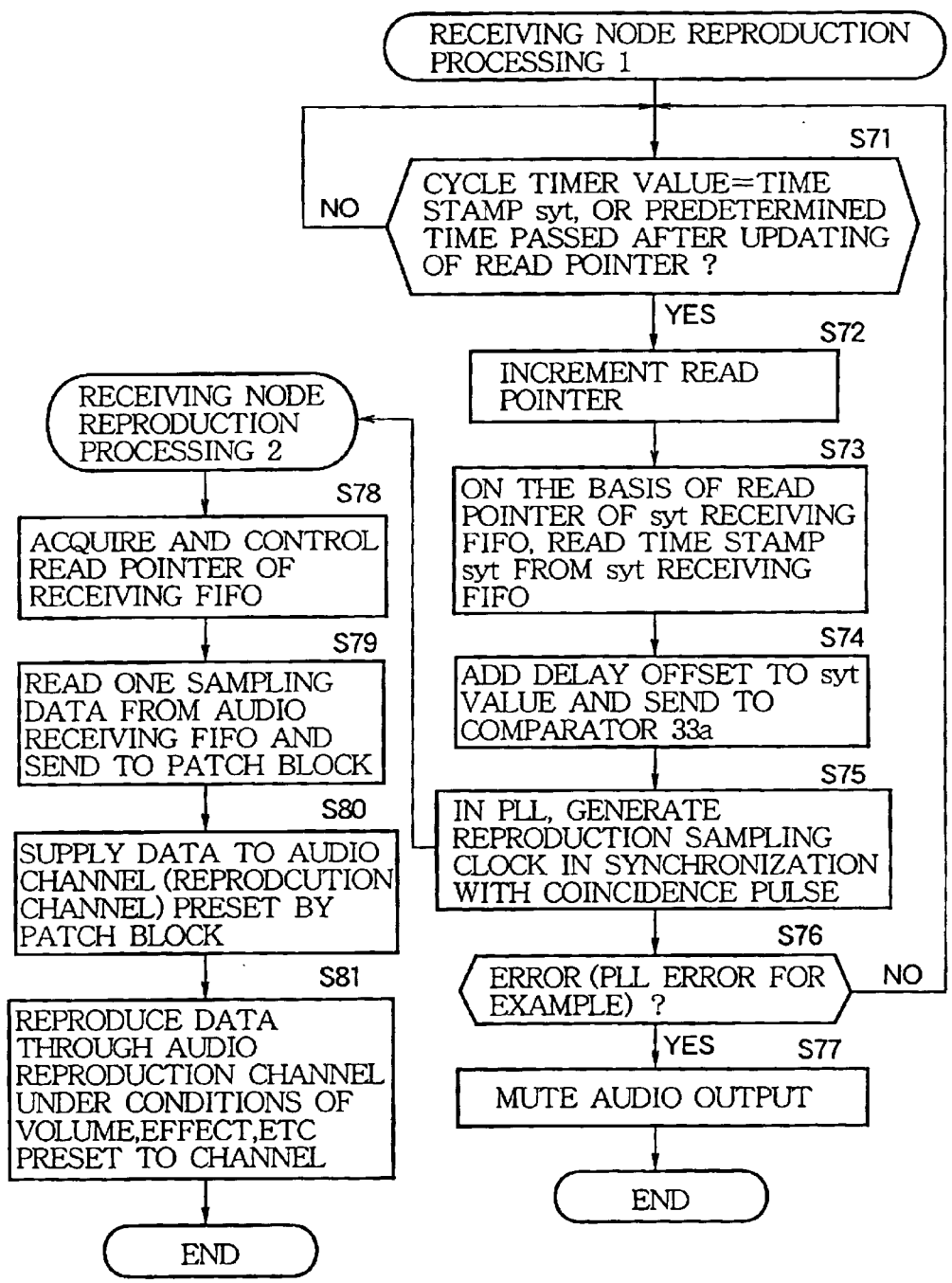
FIG. 7 is a flowchart describing reproduction processing to be executed at a receiving node.
Figure 10:
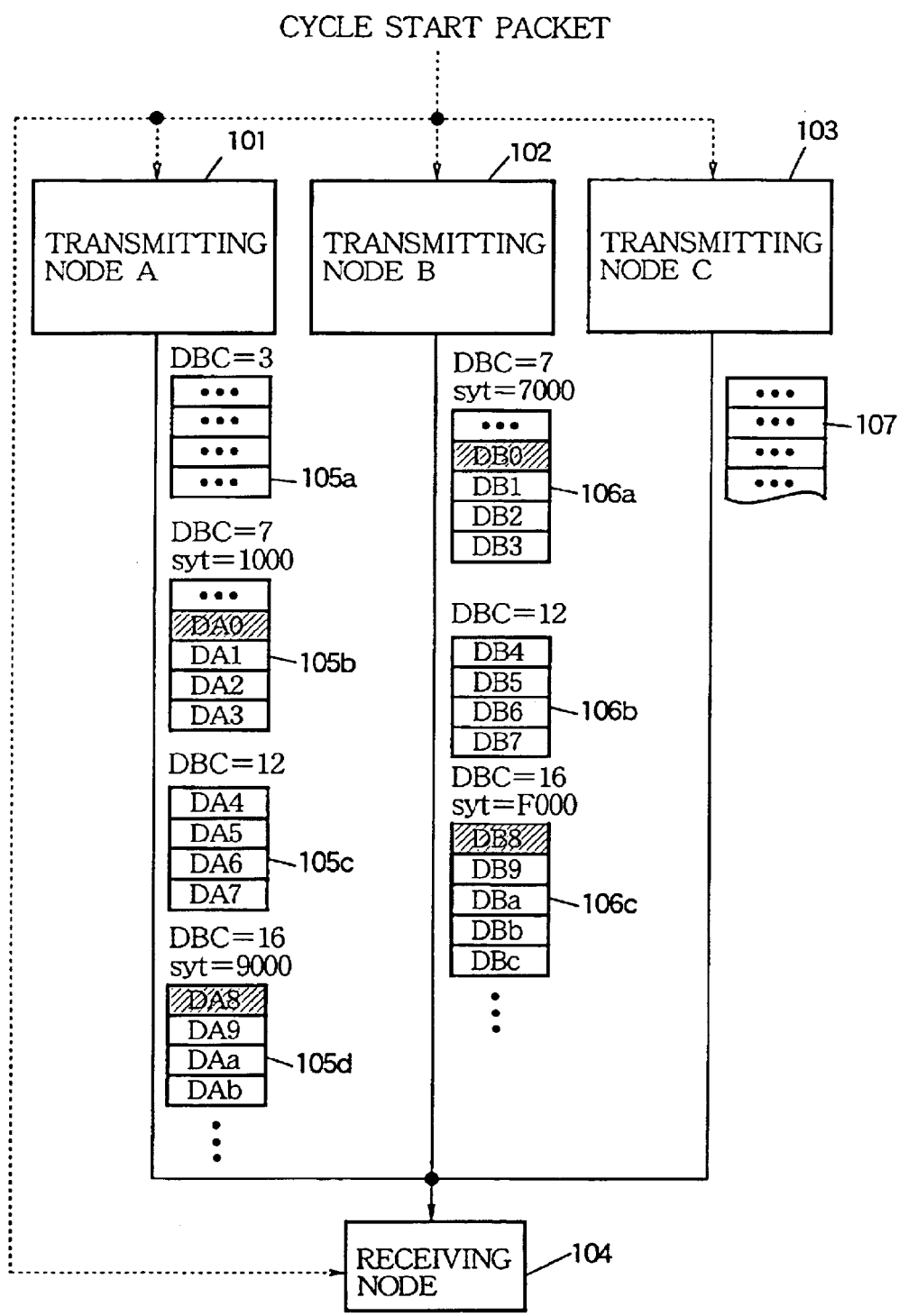
FIG. 10 is a diagram illustrating flows of packets over a network.

FIG. 3 shows one example of the operation of the system illustrated in FIG. 2. With reference to FIG. 3, components similar to those previously described with FIGS. 1 and 2 are denoted by the same reference numerals, and their descriptions will be skipped. FIG. 4 shows the example of the operation shown in FIG. 3 in another aspect. FIG. 7 is a flowchart for describing the example of the operation shown in FIG. 2. The network used for the example is shown in FIG. 10. Each transmitting node has two audio channels (for example, a right-hand channel and a left-hand channel) for one block data.

As shown in FIG. 3, the audio receiving FIFO 12a temporarily stores the audio data of the left-hand channel constituted by data blocks DA0 through DAf and so on. The audio receiving FIFO 12b temporarily stores the audio data of the right-hand channel. The DA0 is a data block at a time corresponding to syt(timestamp)=1000, and DA8 is a data block at a time corresponding to syt=9000. On the other hand, the audio receiving FIFOs 12c and 12d temporarily store the audio data of two channels constituted by data blocks DB0 through DBf and so on. The DB0 is a data block at a time corresponding to syt=7000. The DB8 is a data block at a time corresponding to syt=F000. As described, in the inventive packet receiving apparatus, the receiving buffers 12a–12d are separately allotted to the plurality of the transmitting nodes and are further assigned to channels of the event sequence data contained in each packet from each transmitting node, and the writing section 31 distributes the event sequence data of one packet from one transmitting node to a corresponding one of the receiving buffers 12a–12d according to information which is contained in said one packet and which identifies said one transmitting node and the channel.

The following specifically describes an operation of the audio data reproduction in a receiving node with reference to FIG. 7. Receiving node reproduction processing 1 is performed by using the timestamp receiving FIFO 12k. In step S71, the comparator 33a shown in FIGS. 2 and 3 compares the time of the cycle timer 34 with the time of the timestamp, which is read from the first timestamp receiving FIFO 12k and which is added with an offset value (0 in this example). Alternatively, the comparator 33a determines whether a predetermined time has passed after updating of a read pointer by the first timestamp receiving FIFO 12k. If a match is found or the predetermined time is found passed, the system proceeds to step S72; otherwise the system goes back to step S71.

If, for some reason, the time of the timestamp has advanced before the time of the cycle timer 34 of the receiving node (namely, the cycle timer value of the timestamp is smaller than that of the cycle timer 34), the time of the timestamp will never match the time of the cycle timer 34. Therefore, control is practiced such that, when the predetermined time has passed, the system forcibly proceeds to step S72 to read a next timestamp after the passing of the time. In the example shown in FIG. 3, syt=1000 is read from the first timestamp receiving buffer 12k. When the time of the cycle timer 34 reaches 1000, the comparator 33a outputs a coincidence pulse shown in FIG. 4.

In step S72 shown in FIG. 7, the read pointer of the first timestamp receiving FIFO 12k is incremented. In step S73, a next timestamp is read on the basis of the read pointer of the first timestamp receiving FIFO 12k. In step S74, an offset time is added to the time of the timestamp read this time and the resulting time is sent to the comparator 33a. Then, the system proceeds to step S75. In the example shown in FIG. 3, syt=9000 is read in step S75 and sent to the comparator 33a.

In step S75, the PLL 35 generates a reproduction sampling clock synchronized with the coincidence pulse. The system proceeds to step S76. At the same time, receiving node reproduction processing 2 is executed. In step S76, it is determined whether an error has occurred or not. For example, an error is detected if the value of a counter for counting the number of received data blocks does not match the value of the DBC included in the CIP header of a packet. Alternatively, an error is detected if, on the basis of a received timestamp, the incremental value in the time of the received timestamp does not match a preset timestamp interval, or the value of the number of reproduction sampling clocks at an interval between adjacent coincidence pulses does not match the value 8 determined by the timestamp interval (namely, out of phase-locked-loop in the PLL 35). At the same time, a reception of an interrupt packet indicative of an error occurrence from the transmitting node may be also detected. When the error is detected or the interrupt packet is received, the system proceeds to step S77; otherwise, the system goes back to step S71, continuing the reproduction processing. In step S77, the audio output is muted. For error recovery, the reading of the audio receiving FIFOs 12a through 12h is started when the time of the timestamp received from each transmitting node matches the time of the cycle timer again.

In the example shown in FIG. 3, no error has occurred, so that the system goes back to step S71. When the cycle timer 34 of the receiving node outputs syt 9000 next, the comparator 33a outputs a coincidence pulse as shown in FIG. 4. The read pointer of the first timestamp receiving FIFO 12k is incremented again, upon which syt=11000 is read and outputted to the comparator 33a. The second timestamp receiving FIFO 12l to which the timestamp of the transmitting node 102 is written operates at the same time as the first timestamp receiving FIFO 12k. The processing by the FIFO 12l is not shown but it is generally the same as in steps S71 through S77 except that step S75 does not exist.

The following describes the receiving node reproduction processing 2. In step S78, the read pointers of the audio receiving FIFOs 12a through 12h are acquired and controlled. First, the read pointers of the audio receiving FIFOs 12a and 12b will be described. A data block corresponding to the time of the timestamp at the time when the coincidence pulse is outputted from the comparator 33a is DA0. Therefore, the read controller 36 locates the read pointer of the audio receiving FIFO 12a to the position of the DA0, and starts reading from the DA0. Subsequently, the read controller 36 increments the read pointer for every reproduction sampling block to be outputted from the PLL 35 through the read controller 36.

Consequently, referring to FIG. 3, when a coincidence pulse is outputted with syt=1000 outputted, the read pointer of the audio receiving FIFO 12a is at the position where the DA0 is stored, thereby reading the DA0. Next, when the reproduction sampling clock shown in FIG. 4 is outputted from the PLL 35 through the read controller 36, the read pointer is incremented and the subsequent DA1 is read. Likewise, the DA2 through DA7 are read in synchronization with the reproduction sampling clock. At the time when the coincidence pulse shown in FIG. 4 is outputted with syt= 9000, the read pointer of the audio receiving FIFO 12a is located at a position where the DA8 is stored, thereby reading the DA8. Likewise, the subsequent data blocks are read.

The following describes the read pointers of the audio receiving FIFOs 12c and 12d. Referring to FIG. 3, syt=7000 is read from the second timestamp receiving buffer 12l. When the cycle timer 34 of the receiving node outputs syt=7000, the comparator 33b outputs a coincidence pulse as shown in FIG. 4. This moment indicates a timing at which the audio data to be read from the audio receiving FIFOs 12c and 12d are matched in time and the reading of the resultant data starts. The data block corresponding to this time of the timestamp is the DB0, so that the read controller 36 locates the read pointer of the audio receiving FIFO 12c to the position of the DB0, thereby reading the DB0. Subsequently, the read controller 36 increments the read pointer for every reproduction sampling clock outputted from the PLL 35.

In step S79 shown in FIG. 7, one data block of audio data is supplied from each of the audio receiving FIFOs 12a through 12h to the patch block 13. Normally, one data block is made up of plural channels of audio data outputted with the same sampling clock. These blocks of audio data are simultaneously read as parallel data for every reproduction sampling clock. In step S80, the audio data thus read are supplied to destination reproduction channels (audio0 through audio7) preset in the patch block 13.

The patch block 13 shown in FIG. 1 sets or allocate the reproduction channels to plural channels of event sequence (or audio data) for outputting according to the data structure of the data field in a received packet or by user setting. For example, the audio data supplied from the transmitting node 101 and read from the audio receiving FIFOs 12a and 12b are supplied to the first and second reproduction channels (audio0 and audio1). The audio data from the other transmitting nodes 102 and so on are also assigned at the same time so as to be outputted to other reproduction channels. As described, in the packet receiving apparatus, the patch section 13 allocates the event sequence data read from the receiving buffers 12a–12h to the output channels according to either of header information contained in the packet and setting information inputted from outside. Namely, in step S81, the audio data are reproduced and outputted to the reproduction channels (audio0 through audio7) under conditions such as volume, effect, etc. preset to these channels.

Figure 5:
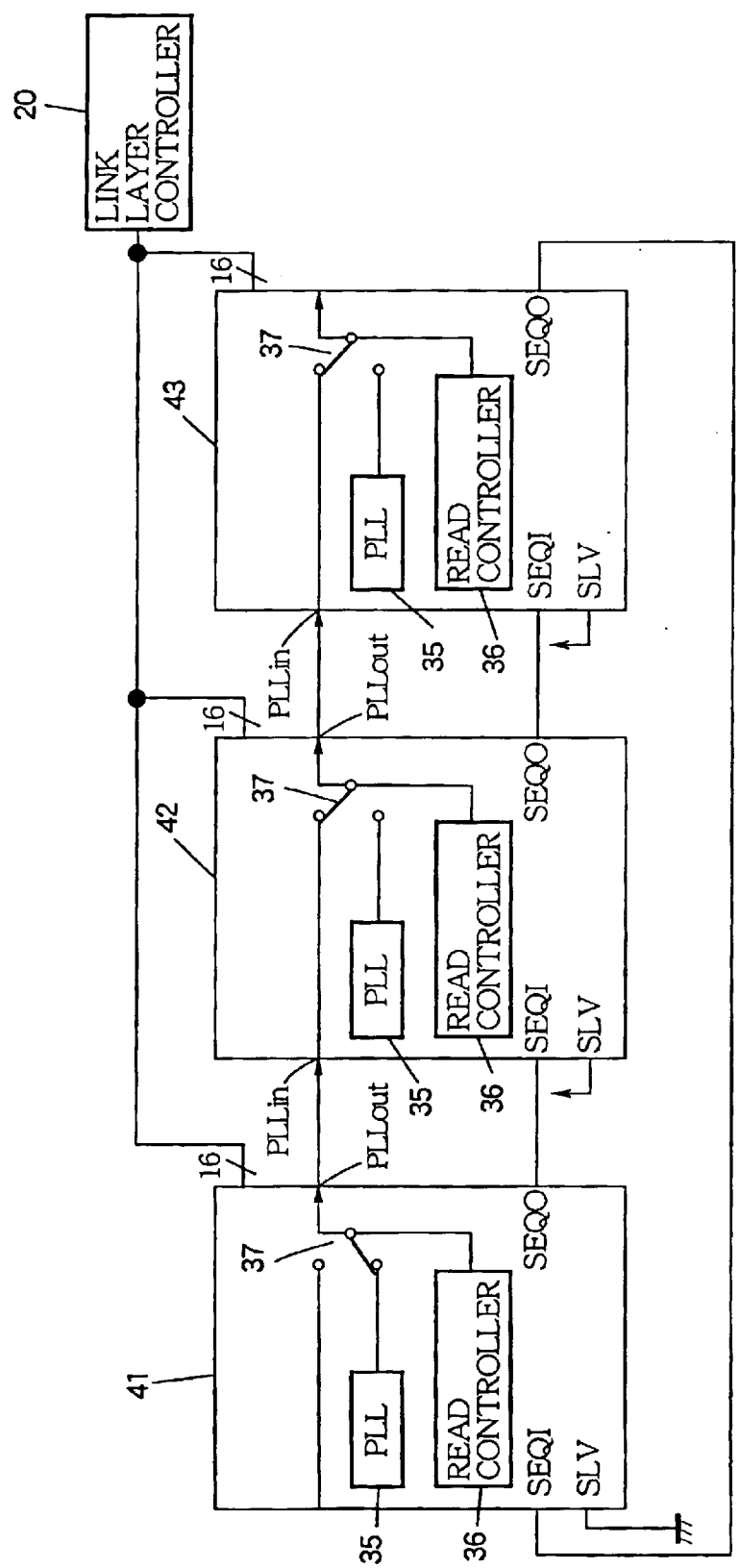
FIG. 5 is a block diagram illustrating an example in which the packet handler shown in FIG. 1 is used in plurality.

Referring to FIG. 5, there is shown an example in which the packet handler shown in FIG. 1 is used in plurality. In FIG. 5, reference numerals 41 through 43 denote packet handlers each being the same as that shown in FIG. 1. FIG. 5 shows a master slave setting terminal SLV, a control input terminal SEQI and a control output terminal SEQO for simultaneous operations of these packet handlers. When the SLV terminal of the packet handler 41 is set to LOW, this packet handler is set to the master. When the SLV terminal of the packet handler 42 or 43 is set to HIGH, the packet handler becomes a slave. A switching block 37 of each packet handler is switched depending on whether the packet handler is master or slave.

The packet handlers 41 through 43 are commonly connected to a link layer controller 20 in a parallel bus manner. First, the master packet handler 41 receives packets. However, if none of the audio receiving FIFOs 12a through 12h is free or available by reason of addition of a new transmitting node or addition of a new audio channel to the existing transmitting nodes, the packet handler 41 sets its SEQO terminal to HIGH. As a result, the SEQI terminal of the packet handler 42 is set to HIGH so that the handler 42 is enabled to receive packets of the above-mentioned new audio channel.

When none of the audio receiving FIFOs 12a through 12h is free in the packet handler 42, the handler 42 sets its SEQO terminal to HIGH. As a result, the SEQI terminal of the packet handler 43 is set to HIGH to enable the handler 43 to receive packets. However, when none of the audio receiving FIFOs 12a through 12h is free in the packet handler 43, the handler 43 sets its SEQO terminal to HIGH. As a result, the SEQ1 terminal of the master packet handler 41 is set to HIGH to enable the handler 41 to receive packets again.

At this moment, if any of the audio receiving FIFOs 12a through 12h of the packet handler 41 is free, the SEQO terminal is LOW, whereby the handler 41 can process the received packets. However, if none of the FIFOs is free, the SEQO terminal of the packet handler 41 is HIGH. If none of the packet handlers 41 through 43 is free, their SEQO terminals are all HIGH, thereby being disabled for receiving and processing new packets.

In the master packet handler 41, a reproduction sampling clock outputted from a PLL 35 is outputted to a PLLin of the packet handler 42 through a switching block 37 and a PLLout of the packet handler 41. Since the packet handler 42 is slave, its switching block 37 is switched to the PLLin side. Hence, the reproduction sampling clock supplied to the PLLin is outputted to a read controller 36 of the packet handler 42 and, at the same time, to a PLLin of the packet handler 43 through a PLLout of the packet handler 42. The same holds with the packet handler 43.

In one aspect, the inventive packet receiving apparatus is constructed for receiving a packet from a transmitting node located on a network. In the inventive apparatus, the reproduction timing clock generating section 35 generates a reproduction timing clock used for synchronous reproduction of the event sequence data contained in the packet based on the timestamp contained in the packet. The output terminal PLLout is provided for outputting the generated reproduction timing clock externally. The input terminal PLLin is provided for inputting an external reproduction timing clock. The data output section 36 reproduces event sequence data contained in the packet received from the transmitting node in synchronization to either of the generated reproduction timing clock and the external reproduction timing clock. The reproduction timing clock setting section 37 operates in a first mode for feeding the reproduction timing clock generated by the reproduction timing clock generating section 35 to the data output section 36 and to the output terminal PLLout, and operates in a second mode for feeding the external reproduction timing clock inputted from the input terminal PLLinto the data output section 36.

In another aspect, the inventive packet receiving apparatus has a plurality of packet handlers including a master packet handler 41 and a slave packet hander 42 for cooperatively receiving packets from transmitting nodes located on a network. Each packet handler is comprised of the unpacketizing section 11 that extracts the event sequence data and the timestamp from the packet, the receiving buffer 12a–12h that is provided for temporarily storing the event sequence data, the writing section 31 that writes the extracted event sequence data into the receiving buffer, and the reading section 36 that reads out the event sequence data from the receiving buffer in synchronization to a reproduction timing clock to reproduce the event sequence data. The master packet handler 41 generates the reproduction timing clock in accordance with the extracted timestamp and provides the generated reproduction timing clock to the slave packet handler 42. Further, the master packet handler 41 operates when the receiving buffer has no space to store the event sequence data for allocating the event sequence data to the receiving buffer of the slave packet handler 42.

Thus, the reproduction sampling clock is generated by the master. The slave receives this reproduction sampling clock. Therefore, the reproduction sampling clock is made common throughout the packet handlers 41 through 43. However, the configuration for matching the time of the occurrence of audio data received by the packet handlers 41 through 43 with the time of the cycle timer 34 of each receiving node is necessary for each packet handler. Therefore, in the slave packet handlers 42 and 43, the timestamps received from plural transmitting nodes are sequentially assigned to the second timestamp receiving FIFO 12l to receive the timestamps. Then, when the time obtained by adding a predetermined offset value to the time of these timestamps matches the time of the internal cycle timer 34, the output of the audio data of the data block corresponding to the time of these timestamps is read.

It should be noted that the slave packet handlers 42 and 43 do not require the operations of the first timestamp FIFO 12k and the PLL 35, so that stopping of these processing capabilities can reduce loads of the CPUs incorporated in these packet handlers and can save the hardware power consumption of the entire system. Alternatively, the first timestamp FIFO 12k may be activated to perform only the time correcting operation. In this case, the time matching may be performed only for a particular transmitting node, and the first timestamp FIFO 12k may be made operative simultaneously with the second timestamp FIFO 12l. The timestamps supplied from plural transmitting nodes may be assigned to the first and second timestamp FIFOs 12k and 12l alternately and sequentially for the time correcting operation.

In the example shown in FIG. 5, the packet handlers 41 through 43 are all identical in internal configuration. It will be apparent to those skilled in the art that the packet handlers fabricated as dedicated to master and slaves respectively may be used. In this case, each dedicated packet handler may be configured without the capabilities that are otherwise required. For example, as seen from FIG. 5, the switching block 37 is not required. The master packet handler does not require the reproduction sampling clock input terminal. The slave packet handlers do not require PLL 35. The slave-only packet handler connected to a terminator like the packet handler 43 does not require the reproduction sampling clock output terminal either.

As described, the simultaneous use of the plural packet handlers 41 through 43 allows flexible system scale changes according to the required specifications of a receiving node. This is enabled by the sharing of the link layer controller 20 among the plural independent audio channel receiving FIFOs 12a through 12h as structures of the packet handlers 41 through 43. This multiple packet handler configuration also allows the transmitting side to have plural data input terminals for each packet handler, and allows these data input terminals to independently generate packets and output them to the link layer controller 20, thereby realizing a transmission method having a high degree of freedom.

In the above description, the delay offsets are all set to 0. If the delay offsets are always set to 0, the offset registers 32a and 32b and the adders 18a and 18b need not be arranged. It should be noted that the delay offset registers 32a and 32b shown in FIGS. 1 and 2 are used to delay the timing of reading the first and second timestamps from the receiving FIFOs 12k and 12l. The value stored in the delay offset register 32a is an offset value set to the reference transmitting node, and the other value stored in the other register 32b is set to another transmitting node which is read-controlled by the second timestamp receiving FIFO. The offset values to be stored in the delay offset registers 32a and 32b may be set from the outside of the packet handlers 41 through 43. Identification of transmitting node may be made by the isochronous transfer channel number in the isochronous header field.

Namely, In the inventive packet receiving apparatus, the timestamp output section 36 retrieves a timestamp contained in a packet received from a transmitting node. The data output section 36 reproduces event sequence data contained in the same packet received from the transmitting node. The offset setting section 32a sets an offset time for the receiving node relative to the transmitting node and adds the offset time to a time indicated by the timestamp retrieved by the timestamp output section 36. The reproduction time control section 36 operates when the time of the timestamp added with the offset time coincides with the current time indicated by the internal cycle timer 34 for controlling the data output section 36 to effect synchronous reproduction of the event sequence data contained in the same packet as the timestamp. In detail, the timestamp output section has a first timestamp buffer 12k for storing a primary timestamp retrieved from a packet which is transmitted from a particular one of the transmitting nodes, and a second timestamp buffer 12l for storing a secondary timestamp retrieved from another packet which is transmitted from other transmitting node than the particular transmitting node. The offset setting section 32a, 32b adds the time indicated by the primary timestamp with an offset time set relative to the particular transmitting node, and adds the time indicated by the secondary timestamp with another offset time set relative to the other transmitting node. Further, the timestamp output section 32a, 32b adds an offset time, which is set by operating an external input provided on the receiving node, to the time indicated by the timestamp.

On the transmitting side, the time of timestamp is set as the value of a reproduction time on the receiving side by estimating propagation delay. By adjusting the offset value on the receiving side, the time of reproducing the audio data supplied from each transmitting node can be shifted from the time of timestamp. Consequently, on the receiving node side, the time of reproducing the audio data can be finely adjusted for each transmitting node from which sequence data are supplied. In addition, the sequence data made past for various reasons can be normally reproduced. Insertion of a delay in anticipation of the propagation delay at transmission side is performed by insertion of an expected value. On the other hand, if a delay can be set as desired by setting an offset value on the receiving side, the actual delay time caused from actual and complicated networking can be handled properly.

Figure 8:
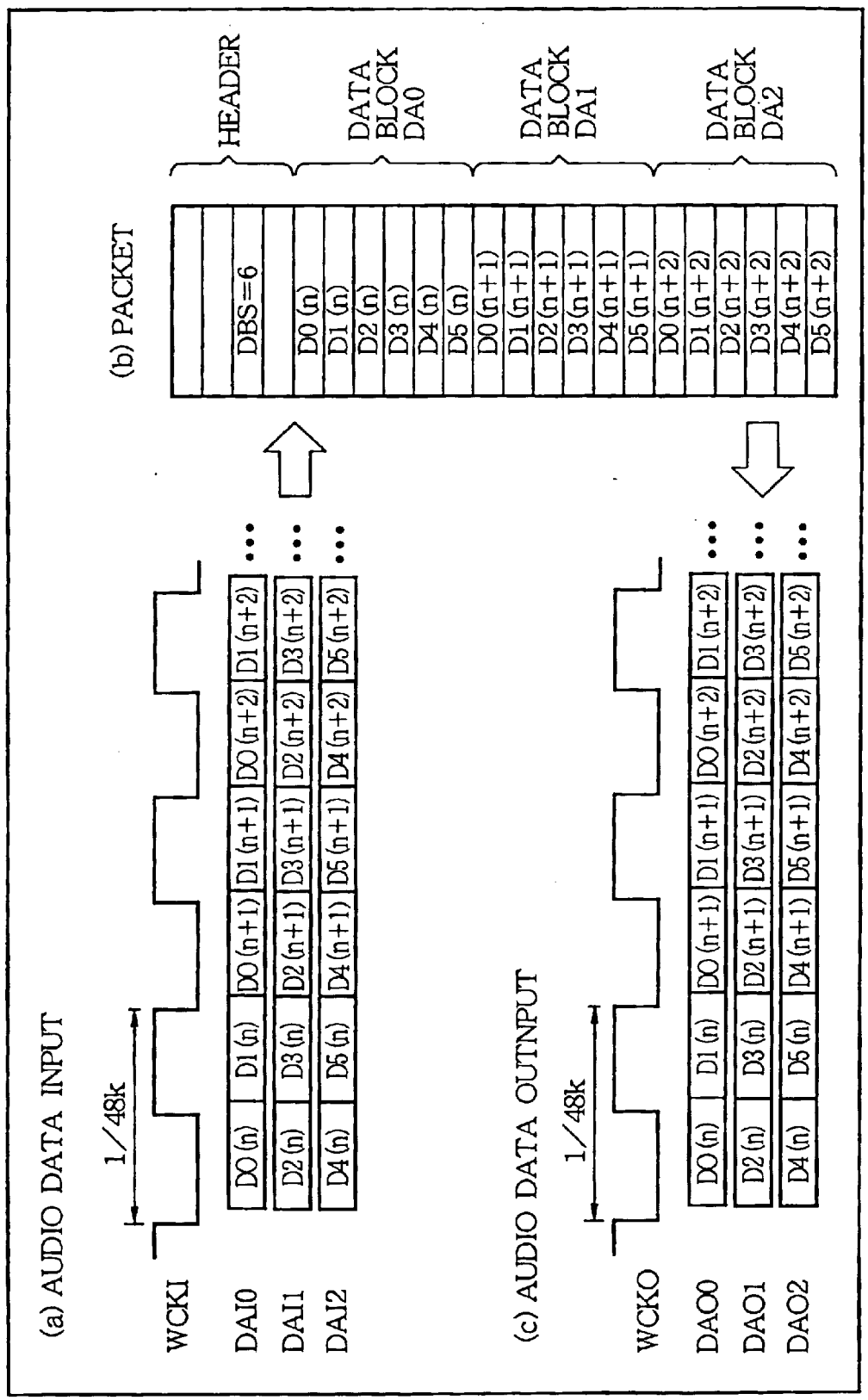
FIG. 8 is a diagram illustrating an example of transmit and receive operations to be executed by the packet handler shown in FIG. 1.

Referring to FIG. 8, there is shown a first example of transmit and receive operations of the packet handler shown in FIG. 1. FIG. 8(a) shows the transmitting side. FIG. 8(b) shows a packet to be transferred through the link layer controller 20. FIG. 8(c) shows the receiving side. The following describes the first example with reference to the block diagram of the FIG. 1 in addition to FIG. 8. This first example is an operation for packetizing audio data, which are composed of six channels of event sequence having an input sampling clock of 48 KHz. In synchronization with the sampling clock WCKI, audio data D0 and D1 are inputted from an input terminal DAI0, audio data D2 and D3 from an input terminal DAI1, and audio data D4 and D5 from an input terminal DAI2.

Take here "5.1 System," which is one of 3D sound systems, as an example. Front left sound (FL) is assigned to D0, front right sound (FR) to D1, rear left sound (RL) to D2, rear right sound (RR) to D3, center sound (C) to D4, and sub woofer (SU) to D5. Referring to FIG. 8(a), 2 channels of audio data are inputted in each of the input terminals DAI0 through DAI2 in a time division multiplexed manner. These data are demultiplexed by the audio interfaces 4b through 4e into parallel data for each of the channels (D0 through D5), and these parallel data are outputted as the audio channels (audio0 through audio5) shown in FIG. 1. In the transmitting FIFO 8a, data D0(n), D2(n), and D4(n) having sampling period (n) are written at the falling edge of the sampling clock WCKI, and data D1(n), D3(n), and D5(n) having sampling period (n) are written at the rising edge of the sampling clock WCKI.

Next, data D0(n+1), D2(n+1), and D4(n+1) having sampling period (n+1) are written at the falling edge of the sampling clock WCKI, and data D1(n+1), D3(n+1), and D5(n+1) having sampling period (n+1) are written at the rising edge of the sampling clock WCKI. Subsequently, the audio data of the audio channels (audio0 through audio5) are written in the same manner. The transmitting FIFO 8a sequentially reads the data D0(n) through D5(n), D0(n+1) through D5(n+1), and D0(n+2) through D5(n+2) in timed relations required by the packetizing block 9.

Referring to FIG. 8(b), the packetizing block 9 forms a packet composed of a header and data blocks DA0, DA1, and DA2 and outputs the packets of parallel data to the link layer controller 20. Each 32-bit data block is composed of 6 event sequences, or 6 channels of audio data, so that the header contains data block size DBS=6.

Referring to FIG. 8(c), the processing at the transmitting side is executed in reverse manner of the receiving side. To be more specific, the packet received from the link layer controller 20 is supplied to the unpacketizing block 11 through the link interface 10 and separated into a header, audio data, non-audio data, a timestamp, and so on. For the audio data in the packet shown in FIG. 8(b), one data block is separated into 6 event sequences (or 6 channels of audio data) on the basis of the header information of DBS=6. Consequently, the data block DA0 is separated into plural audio channels D0(n) through D5(n) (32 bits each) and these audio channels are reproduced.

Subsequently, the data blocks DA1 and DA2 are separated into plural audio channels D0(n+1) through D0(n+1) and D0(n+2) through D5(n+2), respectively. It should be noted that, in the above-described 24-bit*4 audio pack format, each piece of audio data are converted into 32-bit data, which are outputted from the unpacketizing block 11.

The unpacketizing block 11 assigns the audio data D0 through D5 to the audio receiving FIFOs 12a through 12f according to the arrangement order in the data field of the packet. The audio receiving FIFOs 12a through 12f temporarily store the 32-bit parallel data. The audio data D0 through D5 read out at the reproduction sampling period are assigned by the patch block 13 to the audio reproduction channels (audio 0 through audio 7) in a preset manner. In this operation example, D0 is assigned to audio 0, D1 to audio 1, D2 to audio 2, and so on.

Referring to FIG. 8(c), the audio interface 14b multiplexes the audio data of the audio reproduction channels 0 and 1 in time division manner, and outputs the resultant data to the output terminal DAO0 in a serial manner. Likewise, the audio interface 14c multiplexes the audio data of the audio reproduction channels 2 and 3 in a time division manner, and outputs the resultant data to the output terminal DAO1 in a serial manner. The audio interface 14d multiplexes the audio data of the audio reproduction channels 4 and 5 in a time division manner, and outputs the resultant data to the output terminal DAO2 in a serial manner. Consequently, the audio data corresponding to those shown in FIG. 8(a) are reproduced and outputted.

Figure 9:
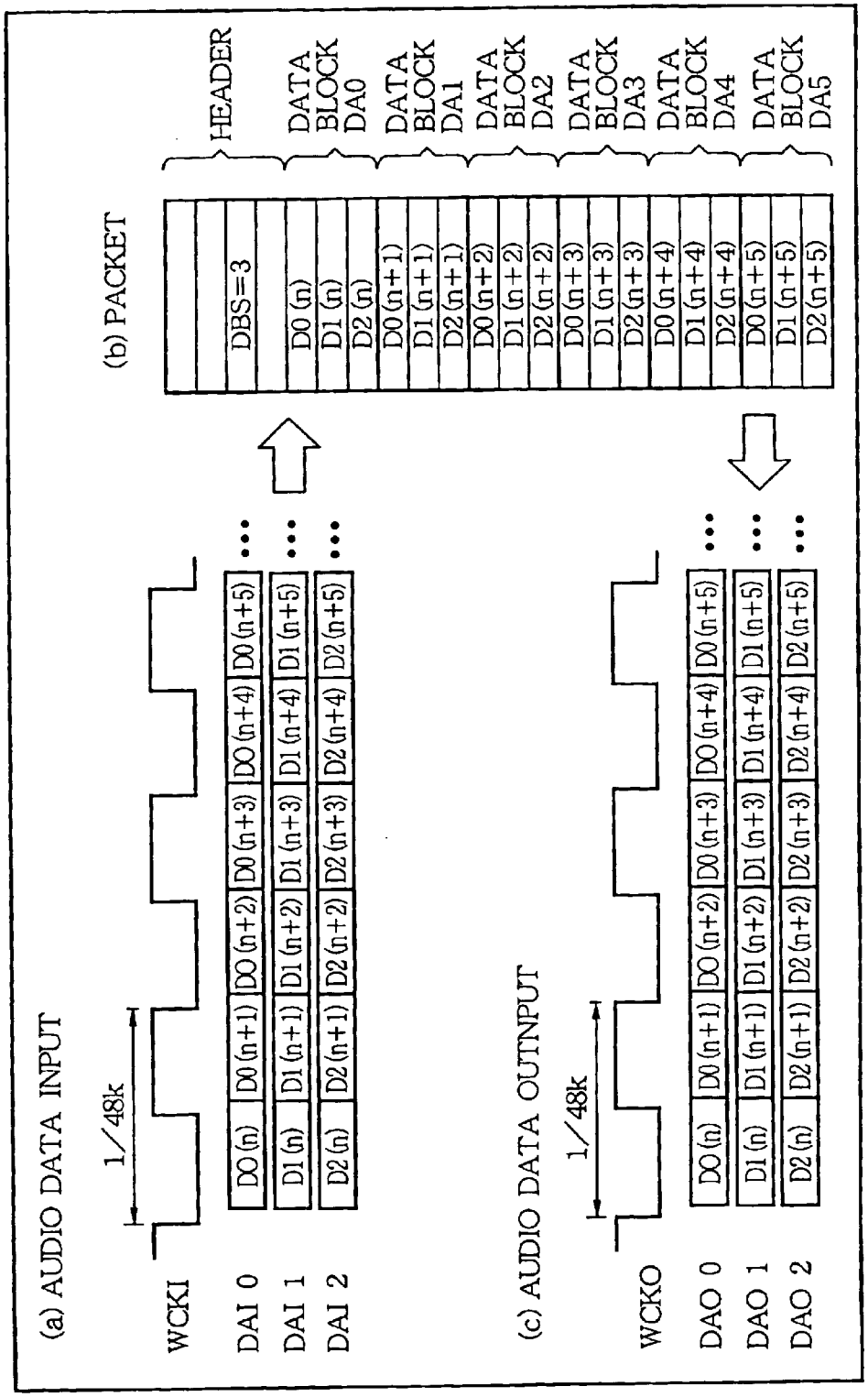
FIG. 9 is a diagram illustrating another example of transmit and receive operations to be executed by the packet handler shown in FIG. 1.

Referring to FIG. 9, there is shown a second example of transmit and receive operations of the packet handler shown in FIG. 1. FIG. 9(a) shows the transmitting side. FIG. 9(b) shows a packet to be transferred through the link layer controller 20. FIG. 9(c) shows the receiving side. This second example shows an operation for transmitting 3-channel audio data which are A/D-converted with a sampling clock of 96 KHz, twice as high as 48 KHz even if the input sampling clock of the transmitting side is 48 KHz. The 3-channel audio data thus obtained are packetized before transmission. To be more specific, in synchronization with a period ½ of the sampling clock WCKI, the audio data D0 is inputted from the input terminal DAI0, the audio data D1 from the input terminal DAI1, and audio data D2 from the input terminal DAI2 in a serial manner. Namely, in the packet transmitting apparatus, the input section 4a–4e sequentially inputs event sequence data which is sampled at a double rate by a sampling clock signal having a half period of the input clock signal.

Take here "2.1 System," which is one of 3D sound systems, as an example. Front left sound (FL) is assigned to D0, front right sound (FR) to D1, and center sound (C) to D2. As shown in FIG. 9(a), the 3-channels of audio data are converted by the audio interfaces 4b through 4d into parallel data for each of the input channel (D0 through D2), and the parallel data are outputted as audio channels audio 0 through audio 5. In the transmitting FIFO 8a, data D0(n), D1(n), and D2(n) having sampling period (n) are inputted at the falling edge of the sampling clock WCKI, and data D0(n+1), D1(n+1), and D2(n+1) having sampling period (n+1) are inputted at the rising edge of the sampling clock WCKI.

Further, data D0(n+2), D1(n+2), and D2(n+2) having sampling period (n+2) are inputted at the falling edge of the sampling clock WCKI, and data D0(n+3), D1(n+3), and D2(n+3) having sampling period (n+3) are inputted at the rising edge of the sampling clock WCKI. Subsequently, the audio data of the audio channels (audio0 through audio5) are written in the same manner. The transmitting FIFO 8a sequentially reads the data D0(n) through D2(n), D0(n+1) through D2(n+1), and D0(n+2) through D2(n+2), . . . D0(n+5) through D2(n+5) in timed relations required by the packetizing block 9.

Referring to FIG. 9(b), the packetizing block 9 forms a packet composed of a header and data blocks DA0 through DA5 and outputs the packet to the link layer controller 20. Each 32-bit data block is composed of 3 event sequences, or 3 channels of audio data, so that the header contains data block size DBS=3.

Namely, in the packet transmitting apparatus, the input section 4a–4e sequentially inputs event sequence data from an external data source in response to an input clock signal having a leading edge and a trailing edge arranged at a predetermined period. The fast packetizing section 9 generates a packet of the inputted event sequence data in response to the leading edge of the input clock signal and generates another packet in response to the trailing edge subsequent to the leading edge, thereby successively generating packets at a rate twice as fast as the input clock signal, and then adds the timestamp every time the predetermined number of data blocks are packetized. The transmitting section 10 sequentially transmits the packets generated by the fast 9 packetizing section.

Referring to FIG. 9(c), the processing at the receiving side is executed in reverse manner as the transmitting side. To be more specific, the packet outputted from the link layer controller 20 is supplied to the unpacketizing block 11 through the link interface 10 and separated into a header, audio data, non-audio data, a timestamp, and so on. For the audio data in the packet shown in FIG. 9(b), one data block is separated into 3 event sequences (or 3 channels of audio data) on the basis of the header information of DBS=3.

Consequently, the data block DA0 is separated into plural audio channels D0(n) through D2(n) (32 bits each), and these audio channels are outputted. Next, the data blocks DA1 through DA5 are outputted as 3-channels of audio data D0(n+1) through D2(n+1) and D0(n+5) through D2(n+5).

The unpacketizing block 11 assigns the audio data D0(n), D1(n), D2(n), D0(n+1), D1(n+1), and D2(n+1) to the audio receiving FIFOs 12a through 12f according to the arrangement order in the data field. Likewise, audio data D0(n+2), D1(n+2), D2(n+2), D0(n+3), D1(n+3), and D2(n+3) are supplied to the audio receiving FIFOs 12a through 12f again. The audio data D0 through D2 temporarily stored in the audio receiving FIFOs 12a through 12f as 32-bit parallel data are those A/D-converted with a sampling period of 96 KHz.

In the patch block 13, the audio data are assigned to the audio reproduction channels 0 through 5 (audio0 through audio7) as preset. In this second operation example, D0 stored in the FIFO 12*a* is assigned to the audio channel 0, D0 stored in the FIFO 12*b* to the audio channel 1, D1 stored in the FIFO 12*c* to the audio channel 2, and so on.

Referring to FIG. 9(*c*), the audio interface 14*b* multiplexes the audio data of the audio channels 0 and 1 in time division manner and outputs the resultant data to the output terminal DA0 in a serial manner. Likewise, the audio interface 14*c* multiplexes the audio data of the audio channels 2 and 3 in a time division manner, and outputs the resultant data to the output terminal DA1 in a serial manner. The audio interface 14*d* multiplexes the audio data of the audio channels 4 and 5 in a time division manner, and outputs the resultant data to the output terminal DA2 in a serial manner. Consequently, the audio data corresponding to those shown in FIG. 9(*a*) are outputted.

Thus, even if the reproduction sampling clock is 48 KHz, the audio data D0 through D2 which are A/D-converted with a sampling period of 96 KHz can be reproduced. Namely, in the inventive packet receiving apparatus, the receiving section 10 sequentially receives packets transmitted from one or more of the transmitting node. The fast unpacketizing section 11 operates in response to a reproduction clock signal having a leading edge and a trailing edge arranged at a predetermined period for retrieving event sequence data from a packet at the leading edge of the reproduction clock signal and for retrieving event sequence data from a next packet at the trailing edge subsequent to the leading edge, thereby successively unpacketizing the packets at a rate twice as fast as the reproduction clock signal. The data output section 36 reproduces the event sequence data in response to the reproduction clock signal which is synchronized to the timestamps contained in the received packets.

Figure 11:
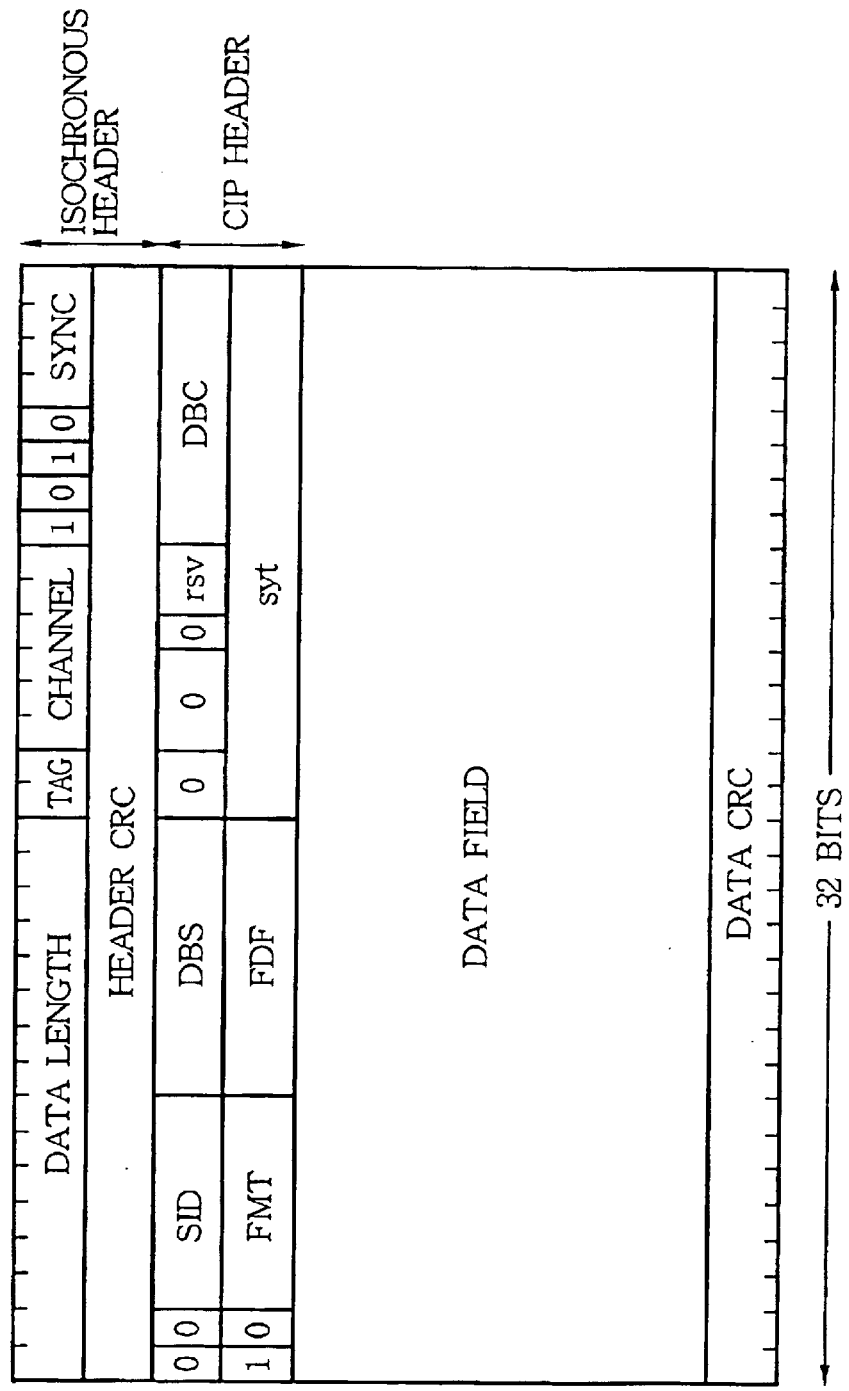
FIG. 11 is a diagram illustrating a packet format for use in isochronous transmission.
Figure 12:
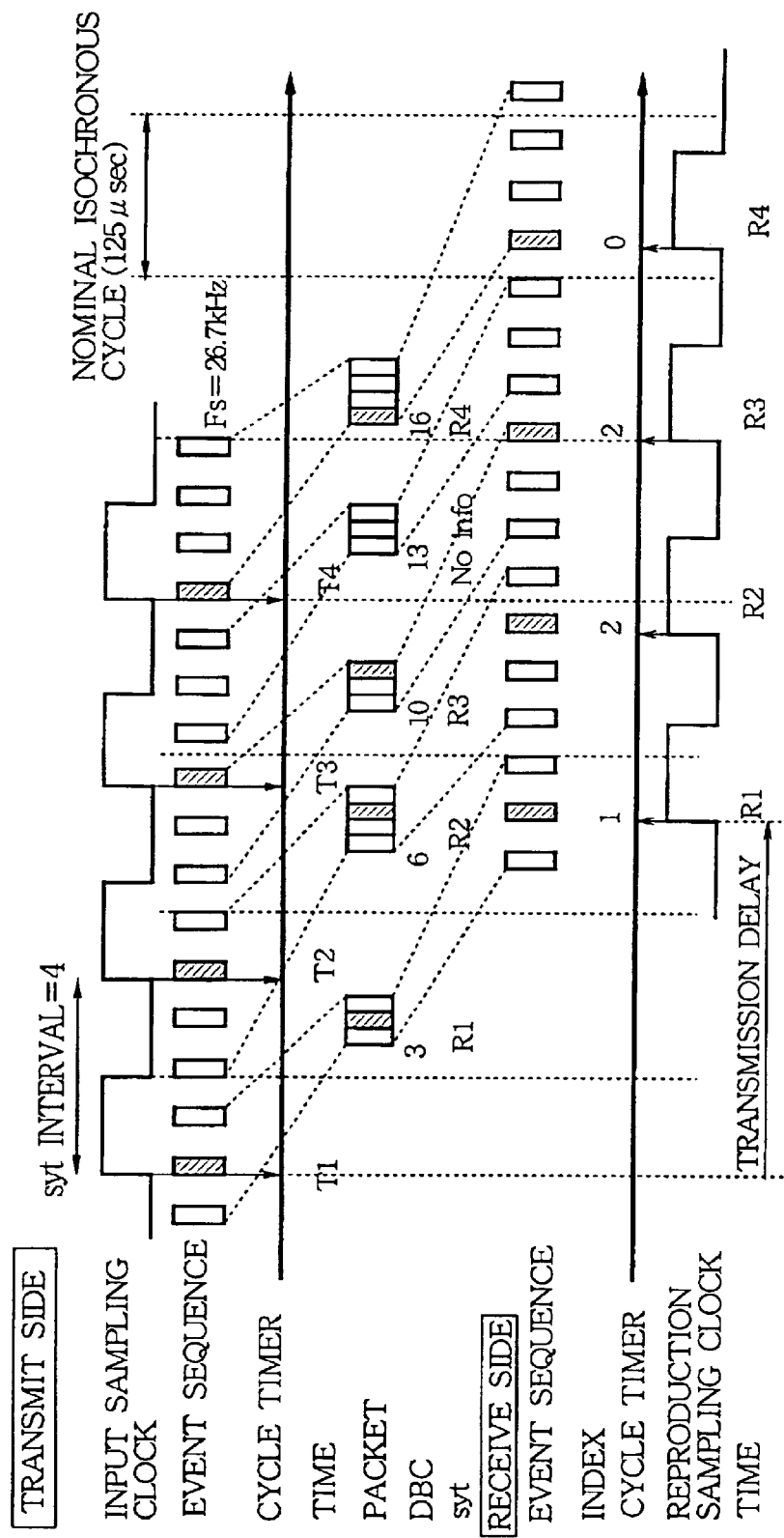
FIG. 12 is a diagram illustrating an operation of isochronous transmission.

The respective transfer modes shown in FIGS. 8 and 9 are switched by the information stored in the header of the packet format shown in FIG. 11. In doing so, each transfer mode can be identified by the value of DBS. Namely, the input section 4*b*–4*e* can switch between a fast sampling mode where the event sequence data is sampled at a double rate by a sampling clock signal having a half period of the input clock signal and a regular sampling mode where the event sequence data is sampled at a regular rate by another sampling clock signal having the same period as the input clock signal. The packetizing section 9 operates under the regular sampling mode for generating a packet of the inputted event sequence data in response to only one of the leading edge and the trailing edge of the input clock signal, and adds the timestamp every time the predetermined number of data blocks are packetized by the packetizing section 9. On the other hand, the unpacketizing section 11 retrieves event sequence data from a packet at only one of the leading edge and the trailing edge of the reproduction clock signal, thereby successively unpacketizing the packets at the same rate as the reproduction clock signal. The switching section switches between the fast unpacketizing mode and the regular unpacketizing mode according to information which is contained in the received packets and which indicates a sampling period of the event sequence data.

As described, the patch block 13 assigns the output destinations of the audio data stored in the audio receiving FIFOs 12*a* through 12*f* according to the transfer modes. In addition, in any transfer mode, the patch block 13 can change audio data destinations by changing assignments by the user setting on the receiving node. For example, in the above-mentioned "5.1 System," sound image pannings can be changed by making replacement between the left channel (FL, RL) and the right channel (RL, RR) or the front channel (FL, FR) and the rear channel (RL, RR).

The transfer modes shown in FIGS. 8 and 9 externally input or externally output two samples per sample period in a time division multiplex manner such that the sampling clock having a duty cycle of 50% is utilized in synchronization with the rising and falling of the sampling clock. This has an advantage of facilitating the input and output operations in synchronization with the sampling clock signal. Alternatively, other transfer mode of reproduction sampling clock m×fs KHz than the basic transfer mode of reproduction sampling clock fs KHz may be provided by externally inputting or externally outputting m samples (m=integer number 3 or higher) per sampling period in a time division multiplex manner.

In the above description, an event sequence (audio data) to be temporarily stored in one of the audio receiving FIFOs 12*a* through 12*h* is one channel of audio data. Alternatively, multiple channels of event sequences (audio data) may be formed in a unit and may be temporarily stored as the unit event sequence in one of the audio receiving FIFOs 12*a* through 12*h*. For example, audio channels 0, 1 (audio 0, audio 1), . . . audio channels 6, 7 (audio 6, audio 7) which are inputted through one input terminal in a time division multiplex manner and outputted to one output terminal in a time division multiplex manner may be formed into four units respectively, and may be temporarily stored in the audio receiving FIFOs 12*a*, 12*b*, 12*c*, and 12*d*.

In the above description, audio data sampling clocks are used for the input timing clock on the transmitting node side and the reproduction timing clock on the receiving node side. Alternatively, a timing clock n or 1/n times (n=integer number 2 or higher) times as high as this sampling clock may be used to form one data block.

Lastly, referring back to FIG. 1, a machine readable medium M such as floppy disk and CD-ROM disk may be used in the packet receiving machine having a CPU for receiving packets with a plurality of receiving buffers 12*a*–12*h* from a plurality of transmitting nodes located on a network for reproduction of event sequence data through output channels 14*a*–14*e*. For example, the medium M contains program instructions executable by the CPU through a disk drive for causing the packet receiving machine to perform a process comprising the steps of extracting the event sequence data and the timestamp from the packet, distributing the extracted event sequence data to the plurality of the receiving buffers 12*a*–12*h* for writing the event sequence data into the receiving buffers, and reading out the event sequence data from the receiving buffers in accordance with the extracted timestamp. In similar manner, the medium M may be used in the packet transmitting machine for transmitting packets to receiving nodes located on a network. For example, the medium M contains program instructions executable by the CPU for causing the packet transmitting machine to perform a process comprising the steps of arranging the event sequence data into data blocks and adding thereto a timestamp so as to sequentially produce packets, then sequentially transmitting the packets, and detecting an error during production of the packets for stopping transmission of a regular packet containing event sequence data and for generating and transmitting a special packet containing a message indicative of occurrence of the error.

As described and according to the invention, the packet transfer apparatus can receive packets containing event sequence data such as audio and music data to generate a synchronous reproduction sampling clock.

In addition, the packet transfer apparatus according to the invention can receive packets containing event sequence data such as audio and music data to reproduce the data at the time specified by the transmitting node side.

Further, the packet transfer apparatus according to the invention can receive packets containing event sequence data such as audio and music data to adjust the reproduction time specified by a timestamp supplied from each transmitting node.

Still further, the packet transfer apparatus according to the invention can transmit and receive packets containing event sequence data such as audio and music data to take actions against error occurrence.

Yet further, the packet transfer apparatus according to the invention can receive packets containing event sequence data and, when the packet transfer apparatus is used in plurality, they can use a common reproduction timing clock, thereby constructing a large-scale packet transfer system.

Besides, in addition to the transmission and reception of packets containing event sequence data such as audio and music data having a normal sampling frequency, the packet transfer apparatus according to the invention can easily transmit and receive packets containing sampling data having a sampling frequency twice as high as the normal sampling frequency.

In addition, the packet transfer apparatus according to the invention can receive packets containing plural pieces of event sequence data such as audio and music data, and can change channels to which the event sequence data are outputted.

While the preferred embodiments of the present invention have been described using specific terms, such description is for illustrative purposes only, and it is to be understood that changes and variations may be made without departing from the spirit or scope of the appended claims.

What is claimed is:

1. A packet transmitting apparatus for packetizing inputted one or more event sequence data into a packet, and transmitting the packet to one or more receiving node located on a network, the packet transmitting apparatus comprising: an input section that inputs the event sequence data; a transmitting buffer that stores the inputted event sequence data; a packetizing section that packetizes the stored event sequence data; and a switching section that switches between a first mode and a second mode, wherein under the first mode, the input section operates in response to a first sampling frequency for inputting 2N (N is a natural number) number of event sequence data at one period of the first sampling frequency such that the 2N number of the event sequence data have the same sampling time, the transmitting buffer stores the event sequence data inputted by the input section, and the packetizing section reads out the event sequence data from the transmitting buffer and makes every 2N number of the read event sequence data into one data block so that the 2N number of the event sequence data in one data block have the same sampling time, and packetizes one or more of the data blocks into one packet by a predetermined isochronous cycle period while a timestamp is added per every M number (M is a natural number) of the data blocks, and wherein under the second mode, the input section operates in response to a second sampling frequency, which is twice as fast as the first sampling frequency, for inputting N number of event sequence data at one period of the second sampling frequency such that the N number of the event sequence data have the same sampling time, the transmitting buffer stores the event sequence data inputted by the input section, and the packetizing section reads out the event sequence data from the transmitting buffer and makes every N number of the read event sequence data into one data block so that the N number of the event sequence data in one data block have the same sampling time, and packetizes one or more of the data blocks into one packet by the predetermined isochronous cycle period while a timestamp is added per every 2M number of the data blocks.

2. A packet receiving apparatus for receiving a packet from one or more transmitting node located on a network, then retrieving one or more event sequence data from the received packet, and outputting the event sequence data, the packet receiving apparatus comprising: an unpacketizing section that unpacketizes the received packet into one or more data block of the event sequence data; a receiving buffer that stores the data blocks; a clock section that generates a reproduction sampling clock signal; an output section that outputs the event sequence data from the receiving buffer in response to the reproduction sampling clock signal; and a switching section that switches between a first mode and a second mode, wherein under the first mode, the unpacketizing section receives a first packet containing one or more data blocks such that each data block is composed of 2N (N is a natural number) number of event sequence data which have been sampled at one period of a first sampling frequency and therefore have the same sampling time while a timestamp is added per every M number (M is a natural number) of the data blocks, and retrieves the data blocks from the received first packet together with the timestamps, the receiving buffer sequentially stores the data blocks retrieved by the unpacketizing section, the clock section outputs a reproduction sampling clock signal of the first sampling frequency which is synchronized among nodes of the network, the output section reads Out the data blocks each composed of the 2N number of the event sequence data from the receiving buffer and outputs the 2N number of the event sequence data by a period of the sampling reproduction clock signal at a timing which is determined according to the reproduction sampling clock signal outputted from the clock section and the timestamps outputted from the unpacketizing section, and wherein under the second mode, the unpacketizing section receives a second packet containing one or more data blocks such that each data block is composed of N number of event sequence data which have been sampled at one period of a second sampling frequency twice as fast as the first sampling frequency and therefore which have the same sampling time while a timestamp is added per every 2M number of the data blocks, and retrieves the data blocks from the received second packet together with the timestamps, the receiving buffer sequentiallystores the data blocks retrieved by the unpacketizing section, the clock section outputs the reproduction sampling clock signal of the first sampling frequency which is synchronized among nodes of the network, and the output section reads out the data blocks each composed of the N number of the event sequence data from the receiving buffer and sequentially outputs the N number of the event sequence data by half a period of the sampling reproduction clock signal at a timing which is determined according to the reproduction sampling clock signal outputted from the clock section and the timestamps outputted from the unpacketizing section.

3. A packet transmitting method of packetizing inputted one or more event sequence data into a packet, and transmitting the packet to one or more receiving nodes located on a network, the packet transmitting method comprising: an input step of inputting the event sequence data; a storing step of storing the inputted event sequence data in a transmitting buffer; a packetizing step of packetizing the stored event sequence data; and a switching step of switching between a first mode and a second mode, wherein under the first mode, the input step inputs, in response to a first sampling frequency, 2N (N is a natural number) number of event sequence data at one period of the first sampling frequency such that the 2N number of the event sequence data have the same sampling time, the storing step stores the event sequence data inputted by the input step in the transmitting buffer, and the packetizing step reads out the event sequence data from the transmitting buffer and makes every 2N number of the read event sequence data into one data block so that the 2N number of the event sequence data in one data block have the same sampling time, and packetizes one or more of the data blocks into one packet by a predetermined isochronous cycle period while a timestamp is added per every M number (M is a natural number) of the data blocks, and wherein under the second mode, the input step inputs, in response to a second sampling frequency which is twice as fast as the first sampling frequency, N number of event sequence data at one period of the second sampling frequency such that the N number of the event sequence data have the same sampling time, the storing step stores the event sequence data inputted by the input step in the transmitting buffer, and the packetizing step reads out the event sequence data from the transmitting buffer and makes every N number of the read event sequence data into one data block so that the N number of the event sequence data in one data block have the same sampling time, and packetizes one or more of the data blocks into one packet by the predetermined isochronous cycle period while a timestamp is added per every 2M number of the data blocks.

4. A packet receiving method of receiving a packet from one or more transmitting nodes located on a network, then retrieving one or more event sequence data from the receiving packet, and outputting the event sequence data, the packet receiving method comprising: an unpacketizing step of unpacketizing the received packet into one or more data blocks of the event sequence data;

a storing step of storing the data blocks in a receiving buffer; a clock step of generating a reproduction sampling clock signal; an output step of outputting the event sequence data from the receiving buffer in response to the reproduction sampling clock signal; and a switching step of switches between a first mode and second mode, wherein under the first mode, the unpacketizing step receives a first packet containing one or more data blocks such that each data block is composed of 2N (N is a natural number) number of event sequence data which have been sampled at one period of a first sampling frequency and therefore have the same sampling time while a timestamp is added per every M number (M is a natural number) of the data blocks, and retrieves the data blocks from the received first packet together with the timestamps, the storing step sequentially stores the data blocks retrieved by the unpacketizing step in the receiving buffer, the clock step outputs a reproduction sampling clock signal of the first sampling frequency which is synchronized among nodes of the network, the output step reads out the data blocks each composed of the 2N number of the event sequence data from the receiving buffer and outputs the 2N number of the event sequence data by a period of the sampling reproduction clock signal at a timing which is determined according to the reproduction sampling clock signal outputted by the clock step and the timestamps outputted by the unpacketizing step, and wherein under the second mode, the unpacketizing step receives a second packet containing one or more data blocks such that each data block is composed of N number of event sequence data which have been sampled at one period of a second sampling frequency twice as fast as the first sampling frequency and therefore which have the same sampling time while a timestamp is added per every 2M number of the data blocks, and retrieves the data blocks from the received second packet together with the timestamps, the storing step sequentially stores the data blocks retrieved by the unpacketizing step in the receiving buffer, the clock step outputs the reproduction sampling clock signal of the first sampling frequency which is synchronized among nodes of the network, and the output step reads out the data blocks each composed of the N number of the event sequence data from the receiving buffer and sequentially outputs the N number of the event sequence data by half a period of the sampling reproduction clock signal at a timing which is determined according to the reproduction sampling clock signal outputted by the clock step and the timestamps outputted by the unpacketizing step.

5. A medium for use in a packet transmitting machine having a CPU for packetizing inputted one or more event sequence data into a packet, and transmitting the packet to one or more receiving nodes located on a network, wherein the medium contains program instructions executable by the CPU for causing the packet transmitting machine under either of a first mode and a second mode to perform a process comprising: an input step of inputting the event sequence data; a storing step of storing the inputted event sequence data in a transmitting buffer; and a packetizing step of packetizing the stored event sequence data, wherein under the first mode, the input step inputs, in response to a first sampling frequency, 2N (N is a natural number) number of event sequence data at one period of the first sampling frequency such that the 2N number of the event sequence data have the same sampling time, the storing step stores the event sequence data inputted by the input step in the transmitting buffer, and the packetizing step reads out the event sequence data from the transmitting buffer and makes every 2N number of the read event sequence data into one data block so that the 2N number of the event sequence data in one data block have the same sampling time, and packetizes one or more of the data blocks into one packet by a predetermined isochronous cycle period while a timestamp is added per every M number (M is a natural number) of the data blocks, and wherein under the second mode, the input step inputs, in response to a second sampling frequency which is twice as fast as the first sampling frequency, N number of event sequence data at one period of the second sampling frequency such that the N number of the event sequence data have the same sampling time, the storing step stores the event sequence data inputted by the input step in the transmitting buffer, and the packetizing step reads out the event sequence data from the transmitting buffer and makes every N number of the read event sequence data into one data block so that the N number of the event sequence data in one data block have the same sampling time, and packetizes one or more of the data blocks into one packet by the predetermined isochronous cycle period while a timestamp is added per every 2M number of the data blocks.

6. A medium for use in a packet receiving machine having a CPU for receiving a packet from one or more transmitting nodes located on a network, then retrieving one or more event sequence data from the received packet, and outputting the event sequence data, wherein the medium contains program instructions executable by the CPU for causing the packet receiving machine under either of a first mode and a second mode to perform a process comprising: an unpacketizing step of unpacketizing the received packet into one or more data blocks of the event sequence data; a storing step of storing the data blocks in a receiving buffer; a clock step of generating a reproduction sampling clock signal; and an output step of outputting the event sequence data from the receiving buffer in response to the reproduction sampling clock signal, wherein under the first mode, the unpacketizing step receives a first packet containing one or more data blocks such that each data block is composed of 2N (N is a natural number) number of event sequence data which have been sampled at one period of a first sampling frequency and therefore have the same sampling time while a timestamp is added per every M number (M is a natural number) of the data blocks, and retrieves the data blocks from the received first packet together with the timestamps, the storing step sequentially stores the data blocks retrieved by the unpacketizing step in the receiving buffer, the clock step outputs a reproduction sampling clock signal of the first sampling frequency which is synchronized among nodes of the network, the output step reads out the data blocks each composed of the 2N number of the event sequence data from the receiving buffer and outputs the 2N number of the event sequence data by a period of the sampling reproduction clock signal at a timing which is determined according to the reproduction sampling clock signal outputted by the clock step and the timestanips outputted by the unpacketizing step, and wherein under the second mode, the unpacketizing step receives a second packet containing one or more data blocks such that each data block is composed of N number of event sequence data which have been sampled at one period of a second sampling frequency twice as fast as the first sampling frequency and therefore have the same sampling time while a timestamp is added per every 2M number of the data blocks, and retrieves the data blocks from the received second packet together with the timestamps, the storing step sequentially stores the data blocks retrieved by the unpacketizing step in the receiving buffer, the clock step outputs the reproduction sampling clock signal of the first sampling frequency which is synchronized among nodes of the network, and the output step reads out the data blocks each composed of the N number of the event sequence data from the receiving buffer and sequentially outputs the N number of the event sequence data by half period of the sampling reproduction clock signal at a timing which is determined according to the reproduction sampling clock signal outputted by the clock step and the timestamps outputted by the unpacketizing step.

* * * * *